US008296512B2

(12) United States Patent
Yokohata et al.

(10) Patent No.: US 8,296,512 B2
(45) Date of Patent: Oct. 23, 2012

(54) RECORDING METHOD FOR A DISK DEVICE HAVING RECORDING REGIONS DIFFERENT IN RECORDING DENSITY

(75) Inventors: Toru Yokohata, Kawasaki (JP); Hitoshi Komoriya, Kawasaki (JP); Takayuki Kawabe, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 895 days.

(21) Appl. No.: 12/360,601

(22) Filed: Jan. 27, 2009

(65) Prior Publication Data
US 2009/0190251 A1 Jul. 30, 2009

(30) Foreign Application Priority Data

Jan. 30, 2008 (JP) .................................. 2008-018477

(51) Int. Cl.
*G06F 12/00* (2006.01)
(52) U.S. Cl. ................. 711/112; 711/161; 711/E12.001
(58) Field of Classification Search .................. None
See application file for complete search history.

(56) References Cited

U.S. PATENT DOCUMENTS

| 5,454,098 | A  | * | 9/1995  | Pisello et al. ............... 703/24    |
| 5,537,636 | A  | * | 7/1996  | Uchida et al. ............... 711/112    |
| 5,568,467 | A  | * | 10/1996 | Inagaki et al. ............. 369/47.43   |
| 6,541,186 | B2 | * | 4/2003  | Sato et al. .................. 430/321   |
| 6,636,942 | B2 | * | 10/2003 | Greco ......................... 711/112  |
| 6,654,851 | B1 | * | 11/2003 | McKean ....................... 711/112   |
| 7,155,566 | B2 | * | 12/2006 | Sasaki et al. ................. 711/112  |
| 7,359,848 | B1 | * | 4/2008  | Nourmohamadian et al. . 703/24          |
| 7,486,460 | B2 | * | 2/2009  | Tsuchinaga et al. ............. 360/48   |
| 7,519,767 | B2 | * | 4/2009  | Slater ........................... 711/111 |
| 7,620,772 | B1 | * | 11/2009 | Liikanen et al. .............. 711/112   |
| 2006/0044979 | A1 | | 3/2006 | Kuraoka et al.                          |
| 2007/0053091 | A1 | * | 3/2007 | Shiratori ......................... 360/8 |

FOREIGN PATENT DOCUMENTS

| JP | 10-091356     | 4/1998 |
| JP | A 2001-243719 | 9/2001 |
| JP | 2003-123205   | 4/2003 |
| JP | 2005-032374   | 2/2005 |
| JP | A 2006-85859  | 3/2006 |

OTHER PUBLICATIONS

Office Action issued by the Patent Office of Japan for Japanese Application No. 2008-018477, mailed Mar. 22, 2011.

* cited by examiner

*Primary Examiner* — Edward Dudek, Jr.
*Assistant Examiner* — Ralph A Verderamo, III
(74) *Attorney, Agent, or Firm* — Greer, Burns & Crain, Ltd.

(57) ABSTRACT

A recording method for a disk device includes the following steps. Sequential data is written into the medium along the track in a predetermined radial direction. Information indicating an end position along the track where the end of the sequential data is written into is stored. The information is read when additional sequential data is to be written into the medium. The additional data is written from a position along the track next to the end position indicated by the information in the predetermined radial direction. The information is updated so as to indicate an end position along the track where the end of the additional sequential data is written into.

9 Claims, 29 Drawing Sheets

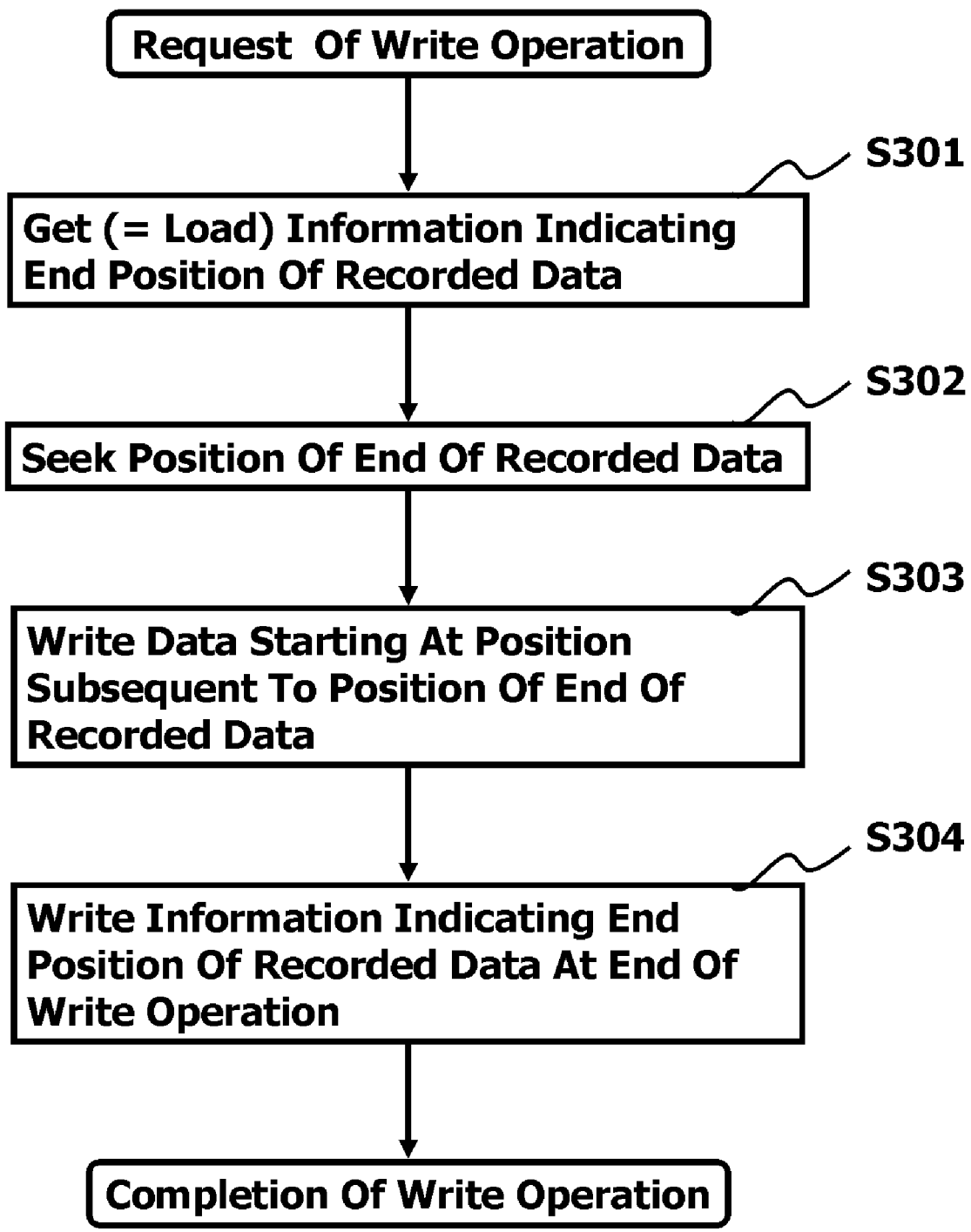

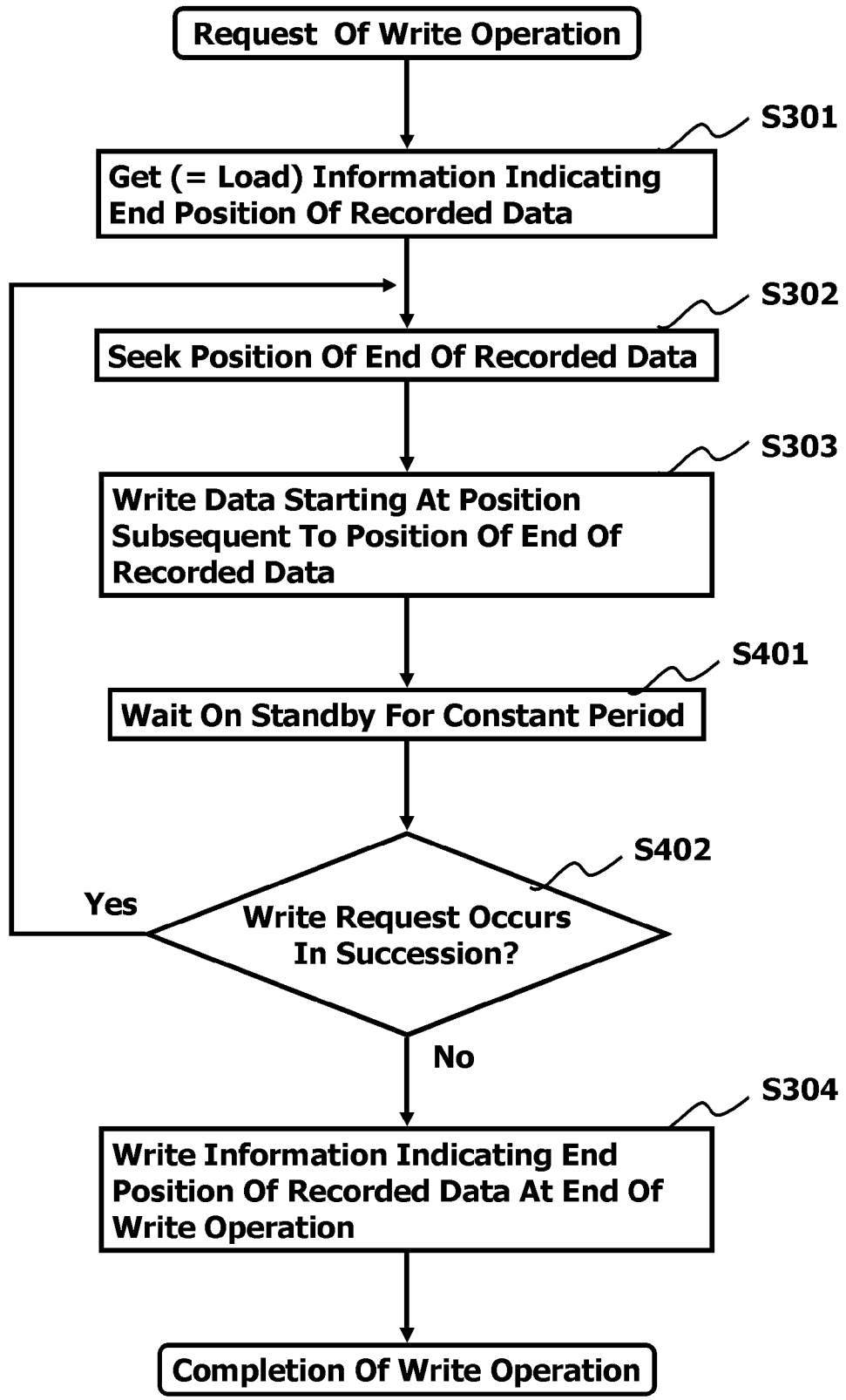

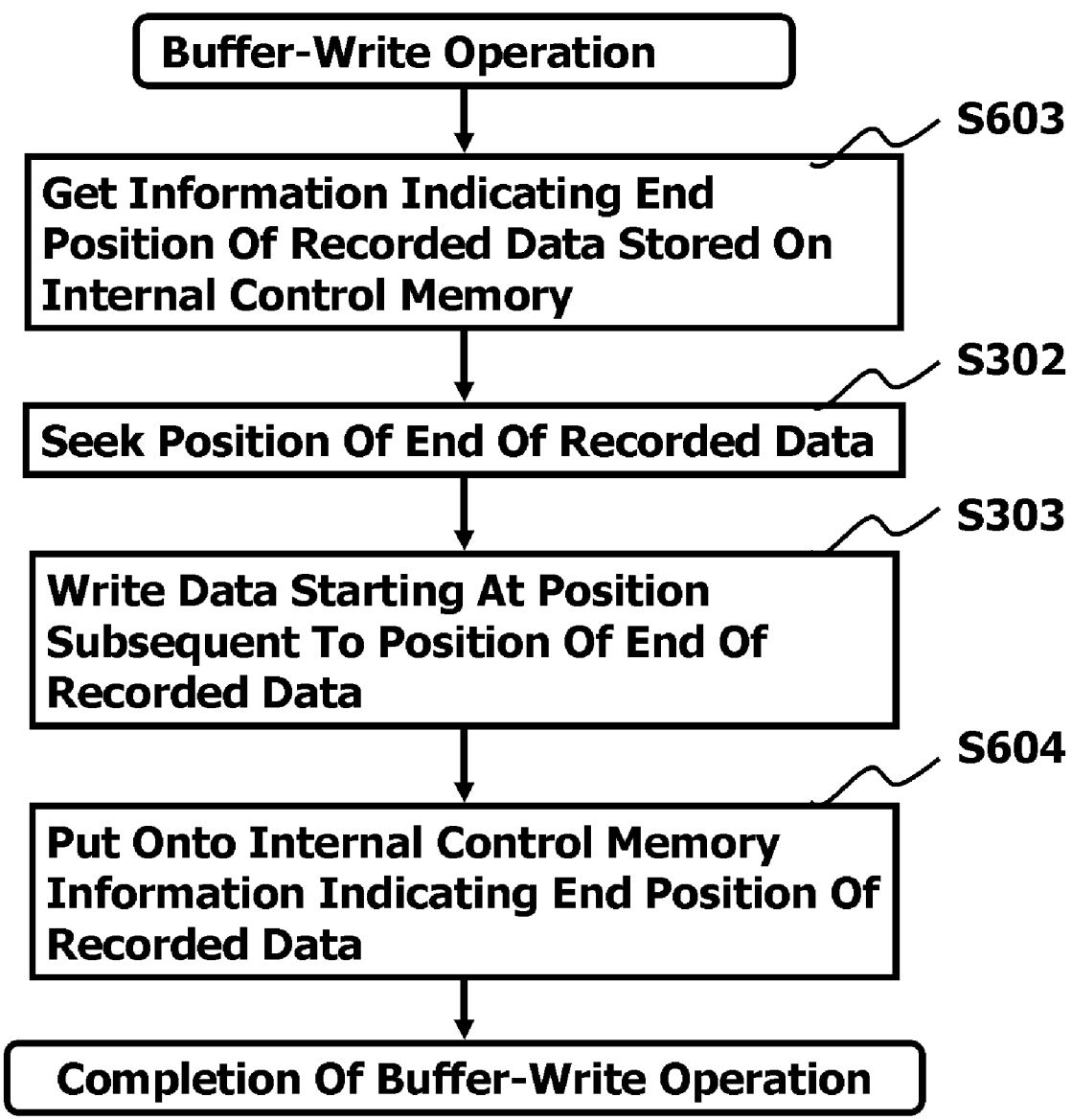

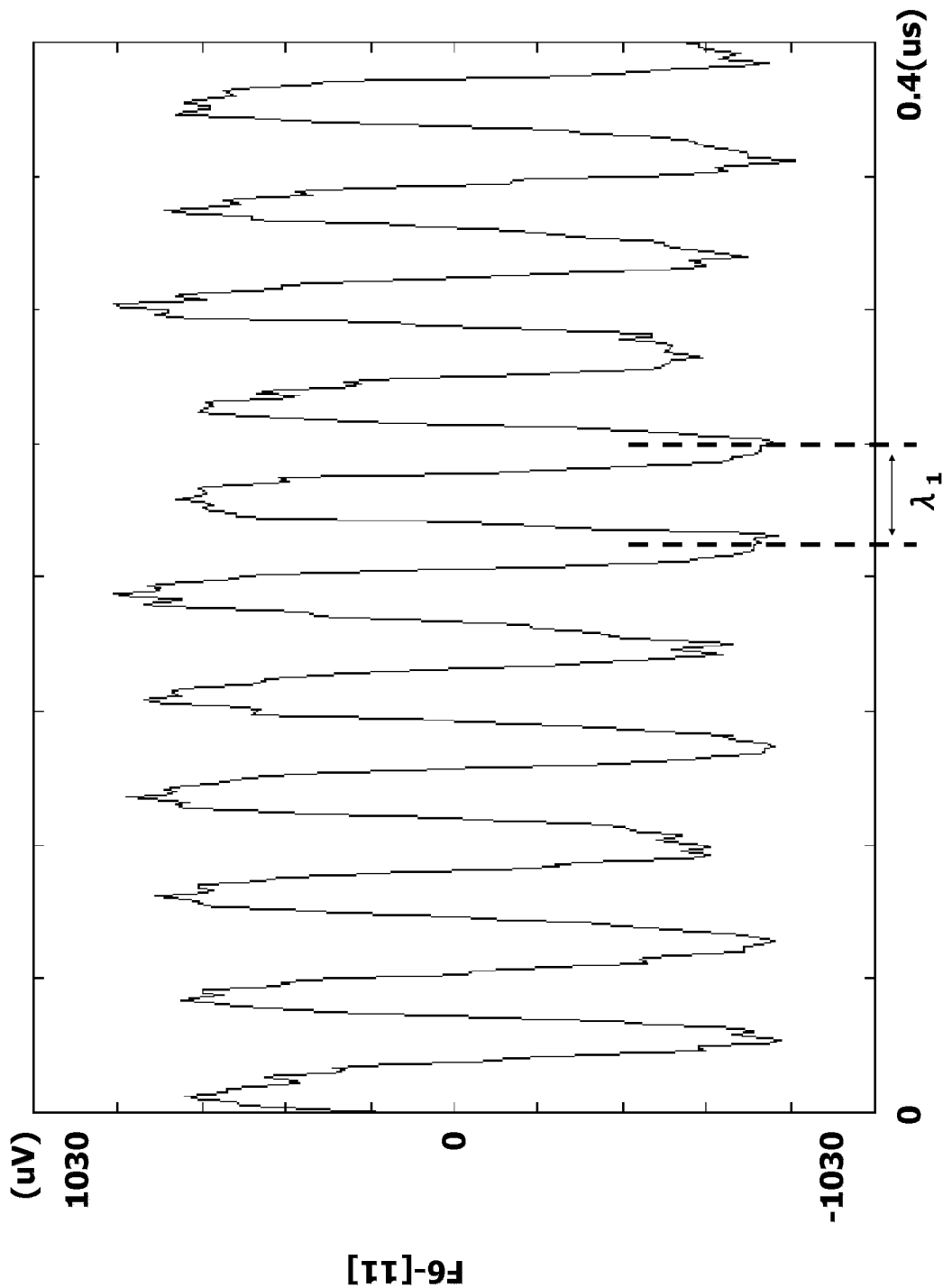

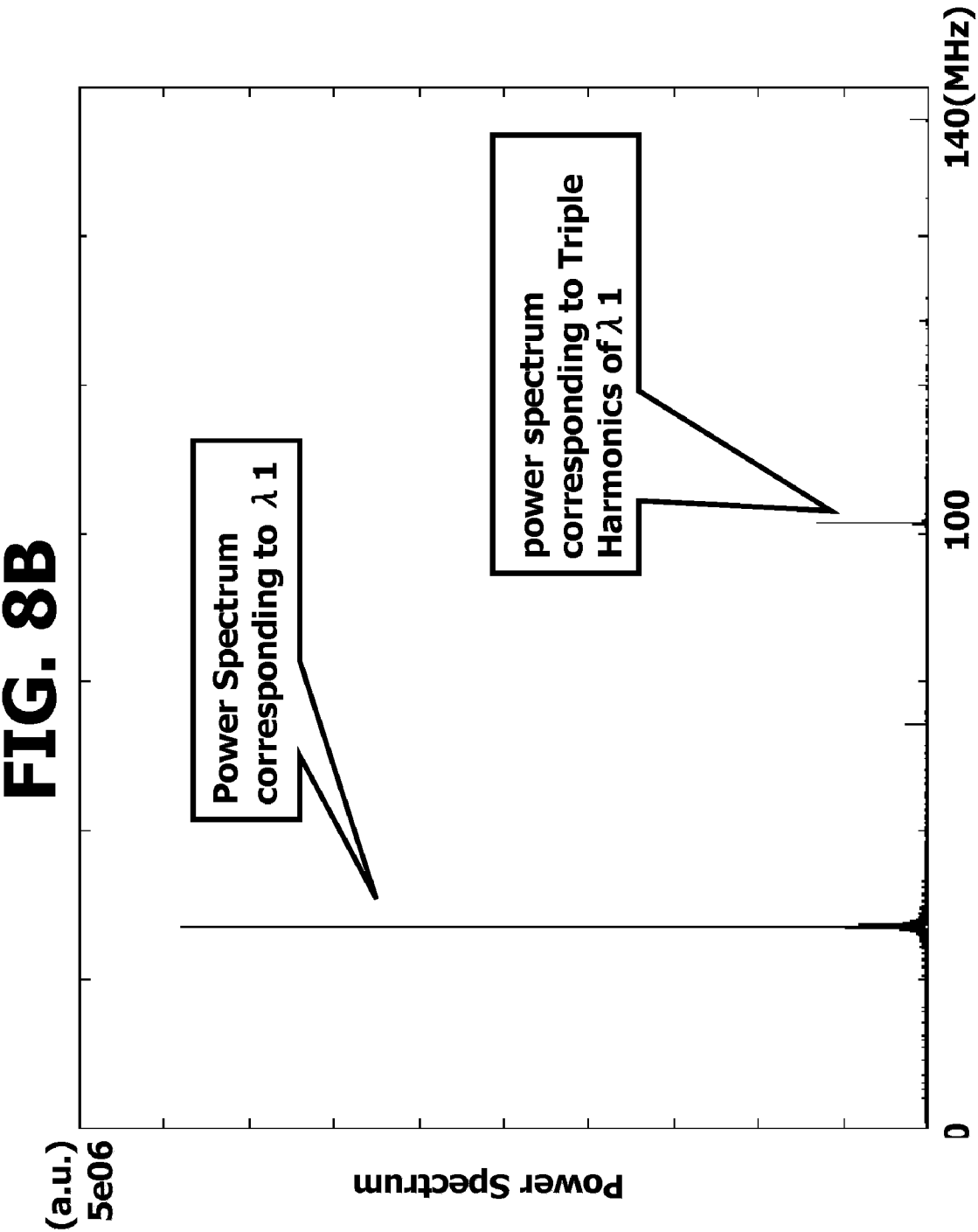

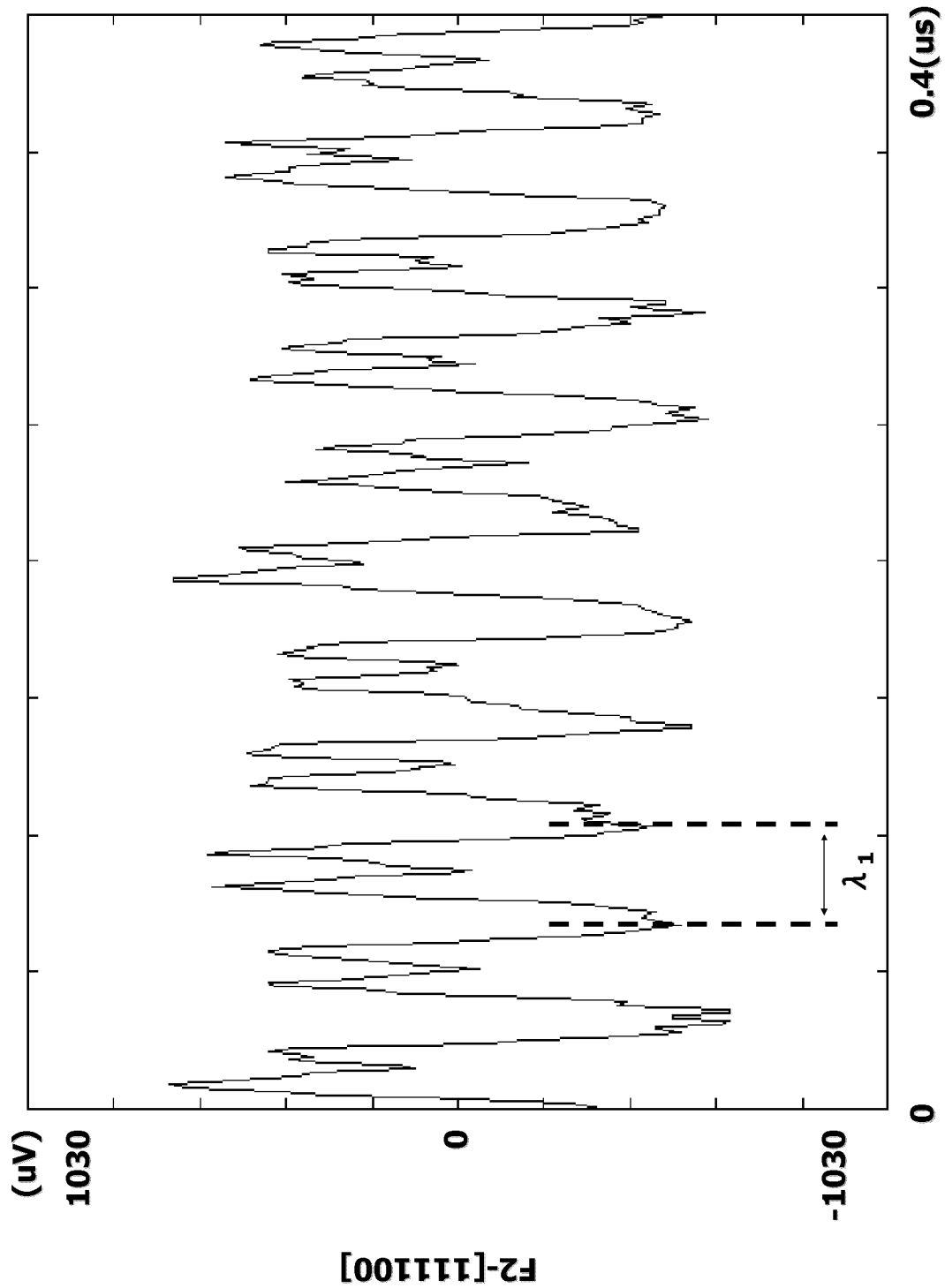

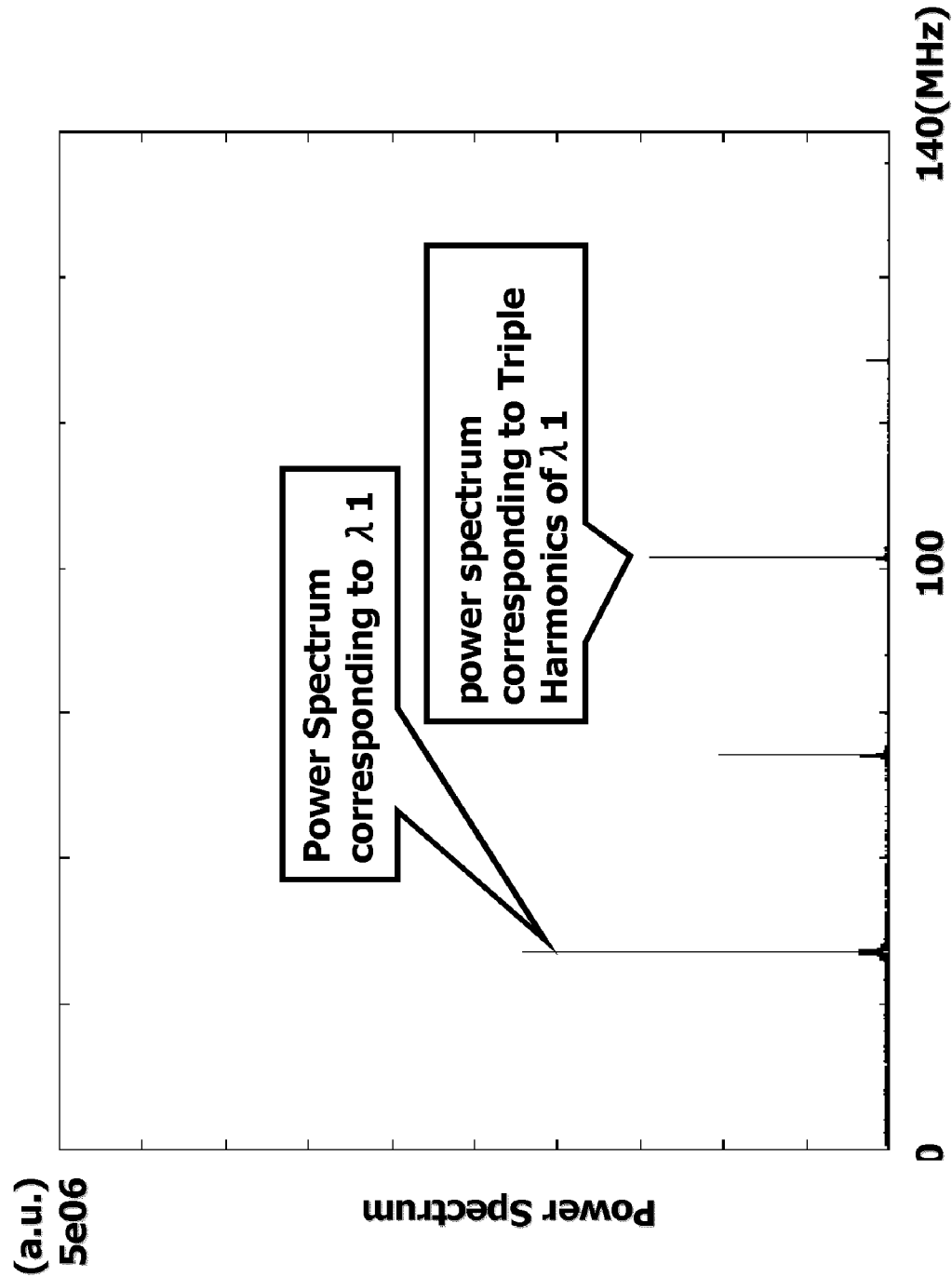

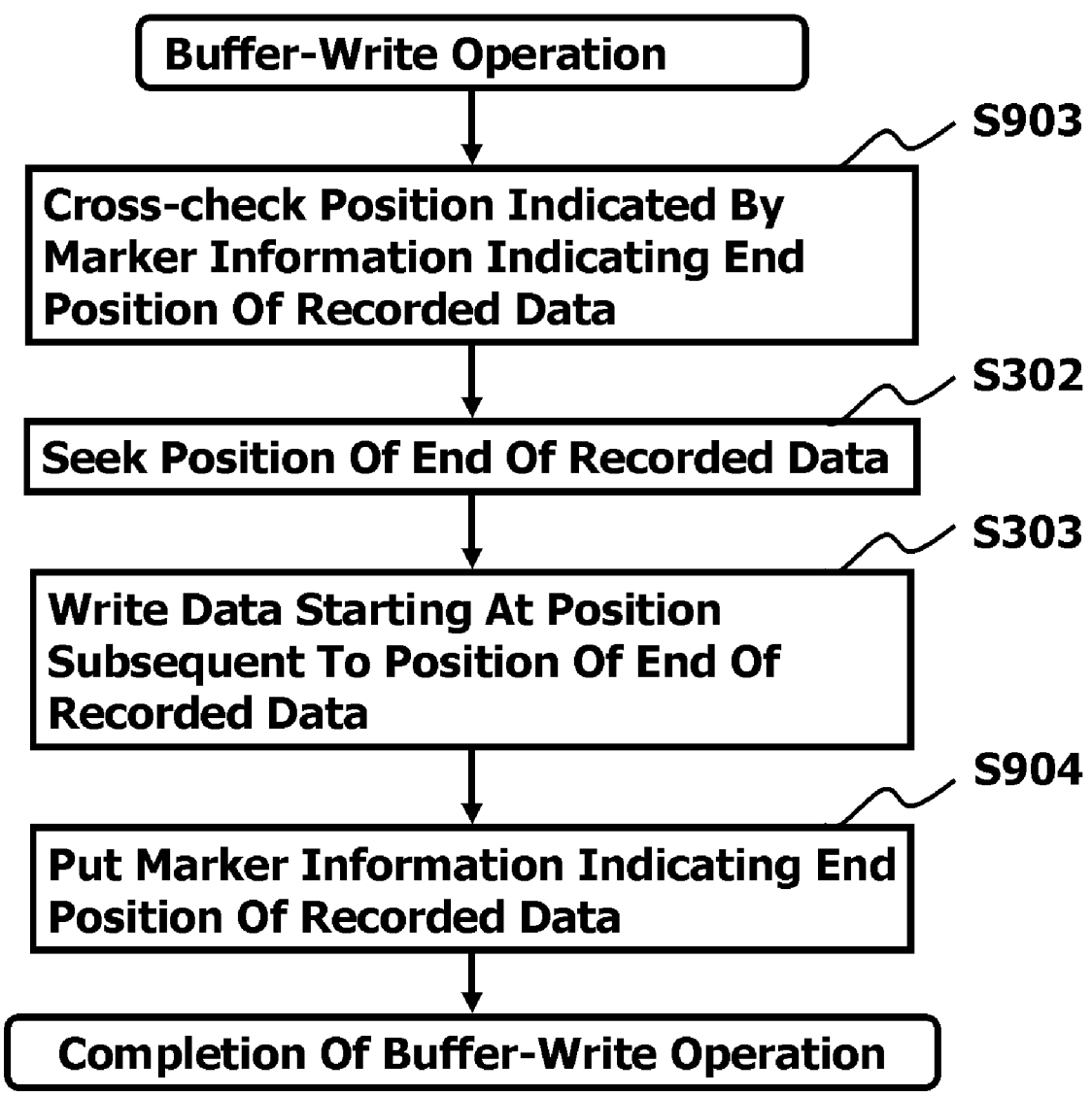

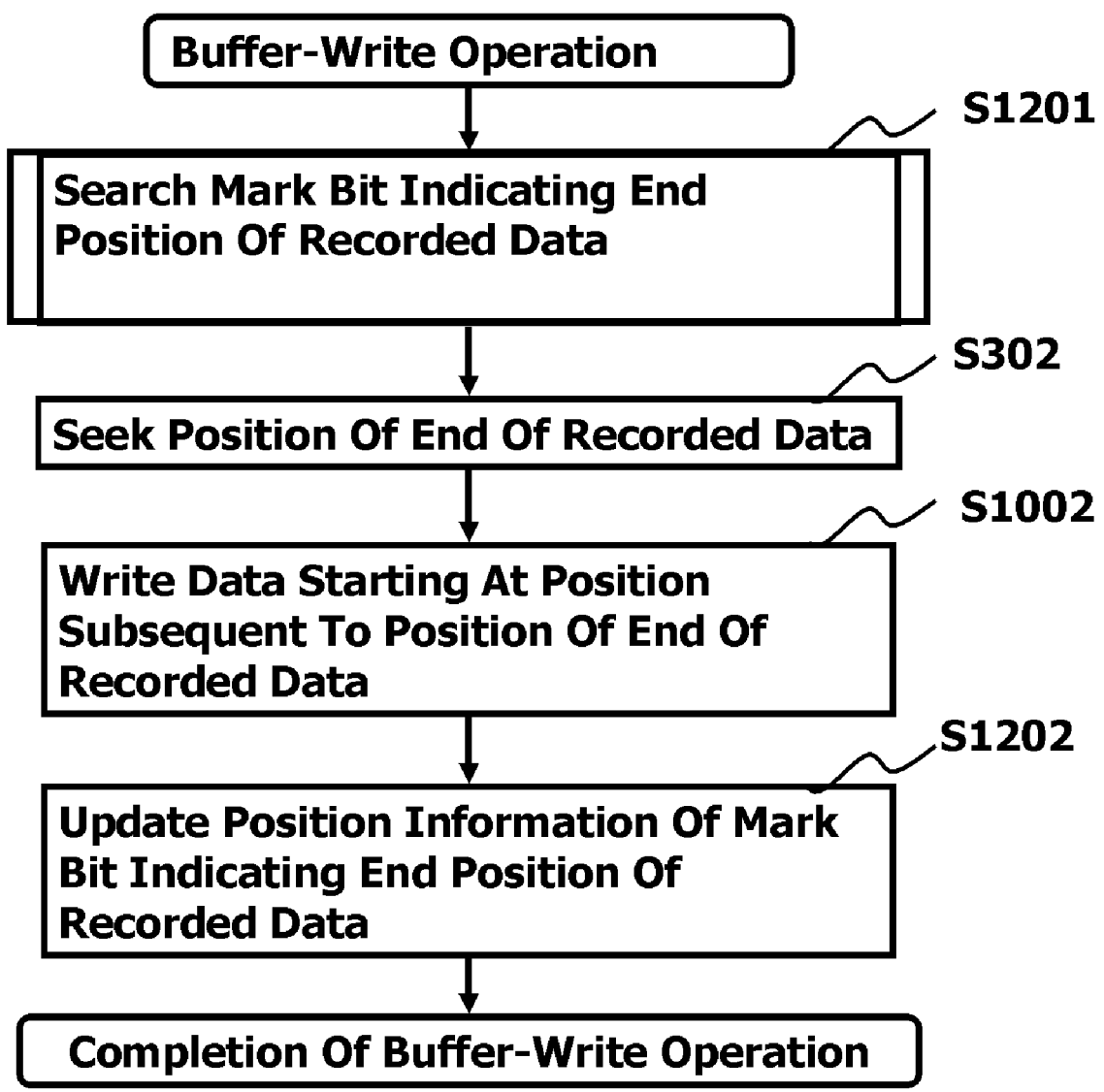

RECORDING METHOD FOR A DISK DEVICE HAVING RECORDING REGIONS DIFFERENT IN RECORDING DENSITY

CROSS-REFERENCE TO RELATED APPLICATION

This application is based upon and claims the benefit of priority of the prior Japanese Patent Application No. 2008-018477, filed on Jan. 30, 2008, the entire contents of which are incorporated herein by reference.

FIELD

An aspect of the invention relates to a data recording method.

BACKGROUND

As compact-design, high-memory capacity and low-cost hard disk drives (HDDs) with a hard-disk medium are currently widespread use, write-once type HDDs find a wide range of applications. Once data is written on the write-once type HDD, the write-once type HDD permits data to be read only. Demand for such HDDs is mounting in the field of "archive recording" applications where long-term recording of business transactions, communication logs, personal activity, and program content data, such as movies and music, is intended.

Recording media used in the archive recording in the related art mainly include a magnetic tape, which is typically low-cost, and a recording device with an optical recording medium (such as a compact disk (CD), a digital versatile disk (DVD), or a magneto-optical (MO) disk)

When an HDD is used as a write-once recording device in the same way as the optical recording device, a one-direction writing method may be used. In the one-direction write method, for example, data may be written inwardly from the outermost track as a starting track.

A medium, such as a magnetic tape medium, permits a sequential access only. When data recording starts on the magnetic recording medium, the tape is searched from the beginning of the tape to determine a start position. A rewind operation performed prior to a search operation and the search operation are not only timing consuming but also need much energy. The repetition of such operations leads to a degradation of the recording medium.

On the other hand, the optical recording medium permits a read operation to be performed in a random access only. However, in a recording method with any particular management area or the like not arranged, a write start position is searched. A write operation is also time consuming as the magnetic tape medium.

In a method with system information or the like for managing data separately recorded, a write start position is immediately obtained. However, since information writing to the recording medium is permitted only once in such a case, another mechanism needs to be implemented.

An overwrite recording method is typically preferable to write the system information or the like for managing data. In an optical write-once medium, management data once written is virtually overwritten using rewritable information and a recording backup region. For example, Japanese Laid-open Patent Publication No. 2006-85859 discloses a plurality of improvements to such a method. One of the improvements is intended to use the recording medium in a manner such that a size limit to the recording backup region to perform a virtual overwrite operation on the management data is treated to be apparently non-existent. To this end, a recording backup region is reserved in the same region as the one storing main data and only meta management data (subject to size limit) managing the recording backup region is stored on the dedicated recording backup region.

A one-direction writing method on the HDD is advantageous over a commonly used random-writing method on the HDD in that a track width limitation caused by an effective core width of a write head is eliminated and that a narrow track pitch is provided.

FIG. 22A illustrates a known random-writing method on the HDD. Since data is written on tracks in random order (for example, (1), (2), and (3) in that order in FIG. 22A) with three tracks arranged in the direction of movement of a head as shown in FIG. 22A, tracks need to be separated from each other. The track width limitation caused by the effective core width of the write head is substantial and a surface recording density of the disk cannot be increased.

FIG. 22B illustrates the one-direction writing method on the HDD. Since data is written on tracks in a fixed order (for example, (1), (2), and (3) in that order in FIG. 22B) with three tracks arranged in the direction of movement of a head as shown in FIG. 22B, writing is performed with one track partly overlapping an immediately preceding track. The track width limitation caused by the effective core width of the write head is small and a surface recording density of the disk can be increased.

Japanese Laid-open Patent Publication No. 2001-243719 discloses other one-direction writing methods.

In accordance with the disclosed technique, see FIG. 23, tracks are grouped into a plurality of zones 2301, namely 2301(#n−1), 2301(#n), 2301(#n+1), . . . . The one-direction writing method is performed on tracks in each zone. A track pitch in the same zone, namely, intra-recording-unit track pitch 2302, is narrow. A track pitch between one track in a zone next to another track in an adjacent zone, namely, inter-recording-unit track pitch) 2303, is wide. This arrangement permits random accessing by zone. Each of the 2304 indicates reproduction elements. The 2305 indicates record track pitch.

Data may be read from tracks belonging to the same zone. When a first track in that zone is recorded, a recording and reproducing signal of the first track is first recorded. When a recording and reproducing signal of a second track is recorded, a signal interference component that results from multiplying the recording and reproducing signal of the first track by a constant value (smaller than 1) is subtracted from a reproducing signal of the second track, and the resulting difference is estimated as a correct reproducing signal of the second track. The estimated value of the second track is recorded. A signal interference component of the second track resulting from multiplying the estimated reproducing signal of the second track by a constant value is subtracted from a reproducing signal of a third track, and the resulting difference is a correct reproducing signal of the third track. This arrangement overcomes the adverse effect of leak of the reproducing signal from adjacent tracks due to the narrow track pitch (inter-track crosstalk).

Since a pitch width is modifiable by zone, variations in reproducing performance due to a difference in positions of the zones on a disk (a position difference of the zones between an inner circle and an outer circle) with respect to the track pitch of each zone is controlled.

The track pitch can be narrowed in the one-direction writing method on the HDD in accordance with Japanese Laid-open Patent Publication No. 2001-243719. If power is back on in the HDD after a power interruption, the recording operation resumes starting with a track and sector subsequent to a track and sector at which power was interrupted previously so that the rule of one-direction writing is followed.

However, the above-described related art fails to state such as a technique to resume the writing operation after power interruption. If efficiency is not important, a sequential search to determine a write start position can be performed in the same way as in the previously described magnetic tape medium. The one-direction writing HDD typically having a large memory capacity takes a long sequential search process time, and the sequential search is not a viable solution.

Since the recording method of the HDD and the recording method of the optical disk work on different principles, the above-described related art disclosed in Japanese Laid-open Patent Publication No. 2006-85859.

SUMMARY

According to an aspect of an embodiment, a recording method for a disk device having a medium having a track for storing data, a head for writing data into the medium or reading data from the medium, the recording method includes: writing sequential data into the medium along the track in a predetermined radial direction, storing information indicating an end position along the track where the end of the sequential data is written into, reading the information when additional sequential data is to be written into the medium, writing the additional data from a position along the track next to the end position indicated by the information in the predetermined radial direction, and updating the information so as to indicate an end position along the track where the end of the additional sequential data is written into.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 3 is an operation flowchart 1 in accordance with the first embodiment.

FIG. 4 is an operation flowchart 2 in accordance with the first embodiment.

FIG. 6A, FIG. 6B, and FIG. 6C are operation flowcharts 4 in accordance with the first embodiment.

FIG. 8A, FIG. 8B, FIG. 8C, and FIG. 8D illustrate signal of marker information representing an end position of recorded data in accordance with the second embodiment.

FIG. 9A, FIG. 9B, and FIG. 9C are operation flowcharts of the second embodiment.

FIG. 12 is an operation flowchart 1 of a fourth embodiment.

DESCRIPTION OF EMBODIMENTS

Figure 1:
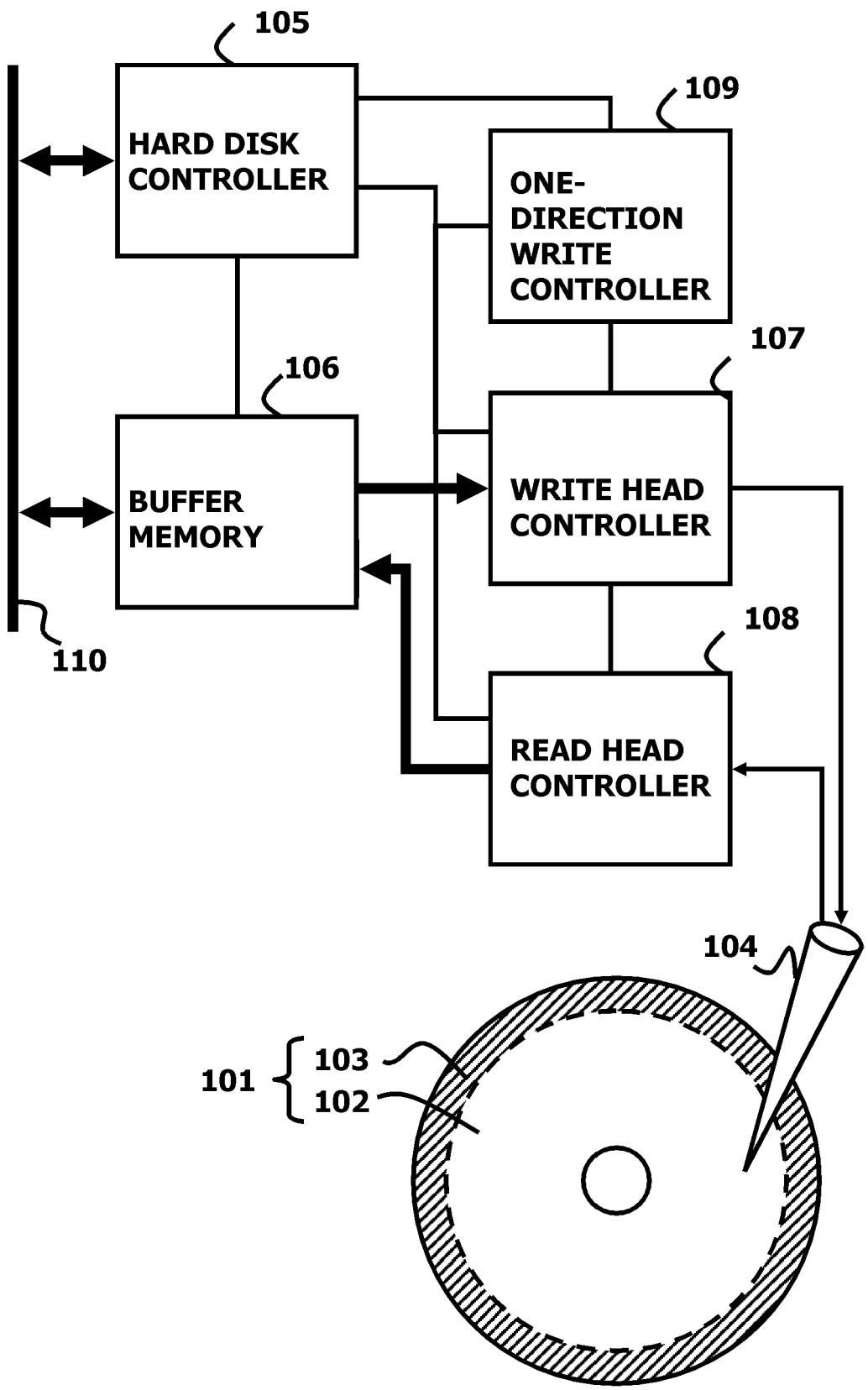
FIG. 1 illustrates a system configuration common to all the embodiments.

Embodiments of the invention are described below with reference to the drawings. FIG. 1 illustrates a system configuration common to all the embodiments.

In accordance with embodiments, a magnetic recording medium 101 includes a small surface recording density area 103 on outer circles and a large surface recording density area 102 inside the small surface recording density area 103.

A hard disk controller 105 receives a disk access command via a bus 110 from a CPU (not shown) or the like (not shown). In response to the disk access command, the hard disk controller 105 controls a buffer memory 106, a read head controller 108, and a one-direction write controller 109. For example, The hard disk controller 105 controls writing sequential data into the medium along the at least one track in a predetermined radial direction, storing information indicating an end position along the at least one track where the end of the sequential data is written into, reading the information when additional sequential data is to be written into the medium, writing the additional data from a position along the at least one track next to the end position indicated by the information in the predetermined radial direction, and updating the information so as to indicate an end position along the at least one track where the end of the additional sequential data is written into.

The buffer memory 106 stores temporarily data to be written onto a magnetic recording medium 101 and data read from the magnetic recording medium 101. The data to be written onto the magnetic recording medium 101 is direct-memory-access (DMA) transferred to the buffer memory 106 from a main memory (not shown) via the bus 110 under the control of the hard disk controller 105. The data read from the magnetic recording medium 101 is DMA-transferred to the main memory (not shown) from the buffer memory 106 via the bus 110 under the control of the hard disk controller 105.

In response to a write control signal from the hard disk controller 105, the one-direction write controller 109 sends a control signal to each of a write head controller 107 and a read head controller 108. The write head controller 107 controls a one-direction write operation on the large surface recording density area 102 on the magnetic recording medium 101 and write and read operations of one-direction write position data on the small surface recording density area 103 on the magnetic recording medium 101.

In response to the control signal from the one-direction write controller 109, the write head controller 107 generates a write signal responsive to write data temporarily stored on the buffer memory 106. The write head controller 107 controls an actuator 104, thereby supplying the write signal to a write head (not shown) arranged at the end of the actuator 104. The write head controller 107 thus performs a write operation on the magnetic recording medium 101.

The read head controller 108 generates a read signal in response to a read control signal from the hard disk controller 105. The read head controller 108 controls the actuator 104, thereby supplying the read signal to a read head (not shown) arranged at the end of the actuator 104. The read head controller 108 performs a read operation on the magnetic recording medium 101. The read head controller 108 stores read data, obtained in response to a change in a read signal, onto the buffer memory 106 temporarily or supplies the read data to the one-direction write controller 109.

First Embodiment

Figure 2:
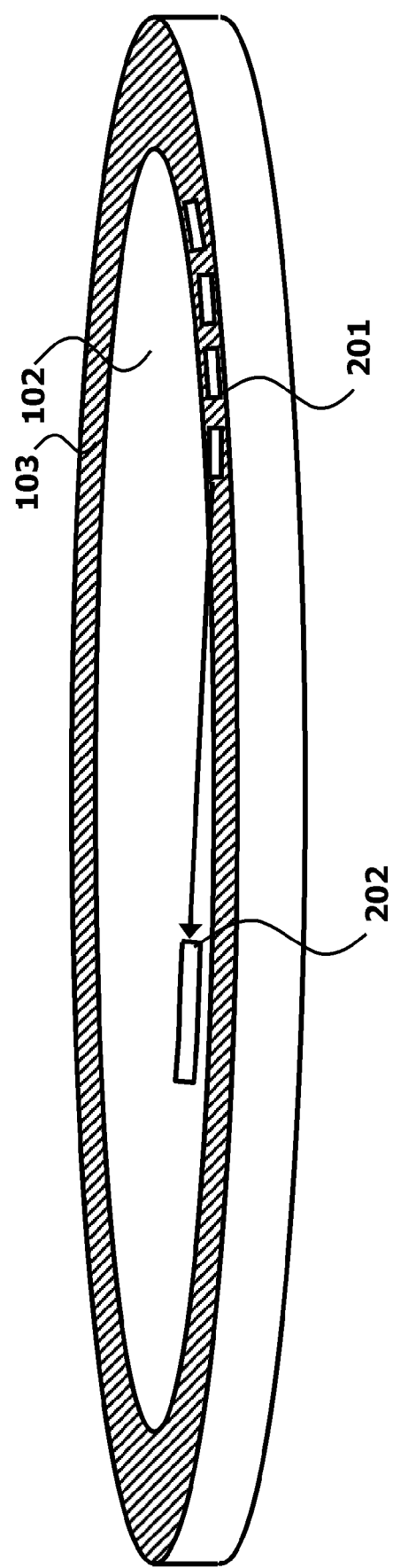
FIG. 2 illustrates a magnetic recording medium in accordance with a first embodiment.

Operation of a first embodiment configured as FIG. 1 is described below. FIG. 2 illustrates the magnetic recording medium 101 of the first embodiment.

In accordance with the first embodiment, the magnetic recording medium 101 includes the large surface recording density area 102, and the small surface recording density area 103. The large surface recording density area 102 has a narrow tack pitch (a high track density) where the one-direction write operation is performed. The small surface recording density area 103 has a wide track pitch (a low track density) and allows overwriting on information stored thereon. In order not to lose information previously recorded on a track (sector) even when power is restored on the hard-disk drive (HDD) subsequent to a power interruption, information 201 indicating a position of an end of written data is recorded on the small surface-recording density area 103.

When power is restored on the hard-disk drive (HDD) subsequent to a power interruption, the information 201 is referenced, and an end 202 of the recorded data is immediately sought on the large surface recording density area 102.

FIG. 3 is an operation flowchart of operation of the one-direction write controller 109 of FIG. 1 in accordance with the first embodiment.

When a data write request is issued from the hard disk controller 105 of FIG. 1, the one-direction write controller 109 of FIG. 1 controls the read head controller 108, thereby getting the information 201 indicating the end position of the recorded data from the small surface recording density area 103 (step S301 of FIG. 3).

The one-direction write controller 109 of FIG. 1 controls the write head controller 107, thereby seeking the head to the position of the end 202 (FIG. 2) of the recorded data on the large surface recording density area 102 on the magnetic recording medium 101 in accordance with the information 201 indicating the end position of the recorded data (step S302 of FIG. 3). The seek operation herein is not a one-directional seek operation.

The one-direction write controller 109 controls the write head controller 107, thereby writing data starting at a position subsequent to the position of the end of the recorded data on the large surface recording density area 102 on the magnetic recording medium 101 (step S303 of FIG. 3).

At the end of the write operation, the one-direction write controller 109 controls the write head controller 107, thereby writing the information 201, indicating the end position of the recorded data at the end of the write operation, onto the small surface recording density area 103 (step S304 of FIG. 3). The write operation is fully completed.

FIG. 4 is an operation flowchart illustrating a more preferable operation of the one-direction write controller 109 of FIG. 1 in accordance with the first embodiment. In the operation flowchart of FIG. 4, steps S301-S304 are identical to the counterparts in the flowchart of FIG. 3.

The operation flowchart of FIG. 4 is different from the operation flowchart of FIG. 3 because steps S401 and S402 are added in the operation flowchart of FIG. 4.

The data write request typically repeatedly occurs within a period of several seconds to several minutes. Reading the information 201 indicating the end position of the recorded data on the small surface recording density area 103 in response to each of the data read requests seems to be too redundant.

In the operation flowchart of FIG. 4, the one-direction write controller 109 waits on standby for a constant period of time subsequent to the data write operation in step S303 in response to one write request (step S401 of FIG. 4).

The one-direction write controller 109 then determines whether a write request occurs in succession (step S402 of FIG. 4).

If the determination in step S402 is yes, the one-direction write controller 109 controls the write head controller 107, thereby writing data starting at a position subsequent to the position of the end of the data recorded in the immediately preceding write operation (step S303 of FIG. 4).

In the operation flowchart of FIG. 4, redundant seek read operations and redundant seek write operations on the small surface recording density area 103 are thus reduced.

A delay-write operation is frequently performed on current HDDs. The delay-write operation is a control operation in which data write requests from a user are accumulated in a write-buffer region of the buffer memory 106, the order of data write requests is readjusted in consideration of write efficiency, and an actual write operation is performed onto the magnetic recording medium 101 with the data write requests collected as many as possible and handled in a batch.

Figure 5A:
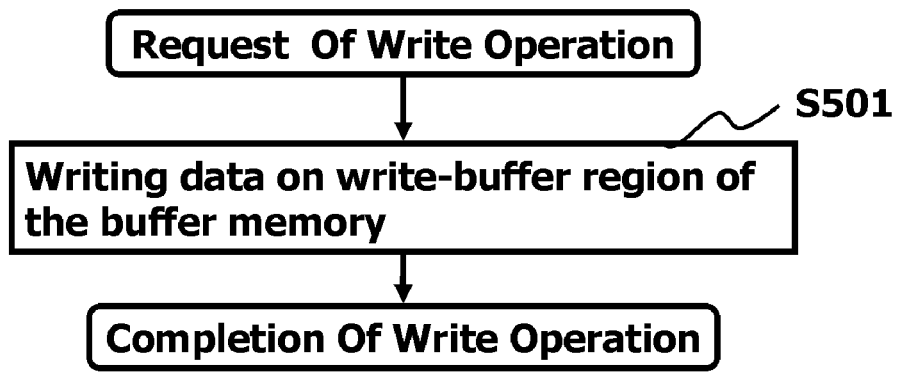
FIG. 5A and FIG. 5B are operation flowcharts 3 in accordance with the first embodiment.
Figure 5B:
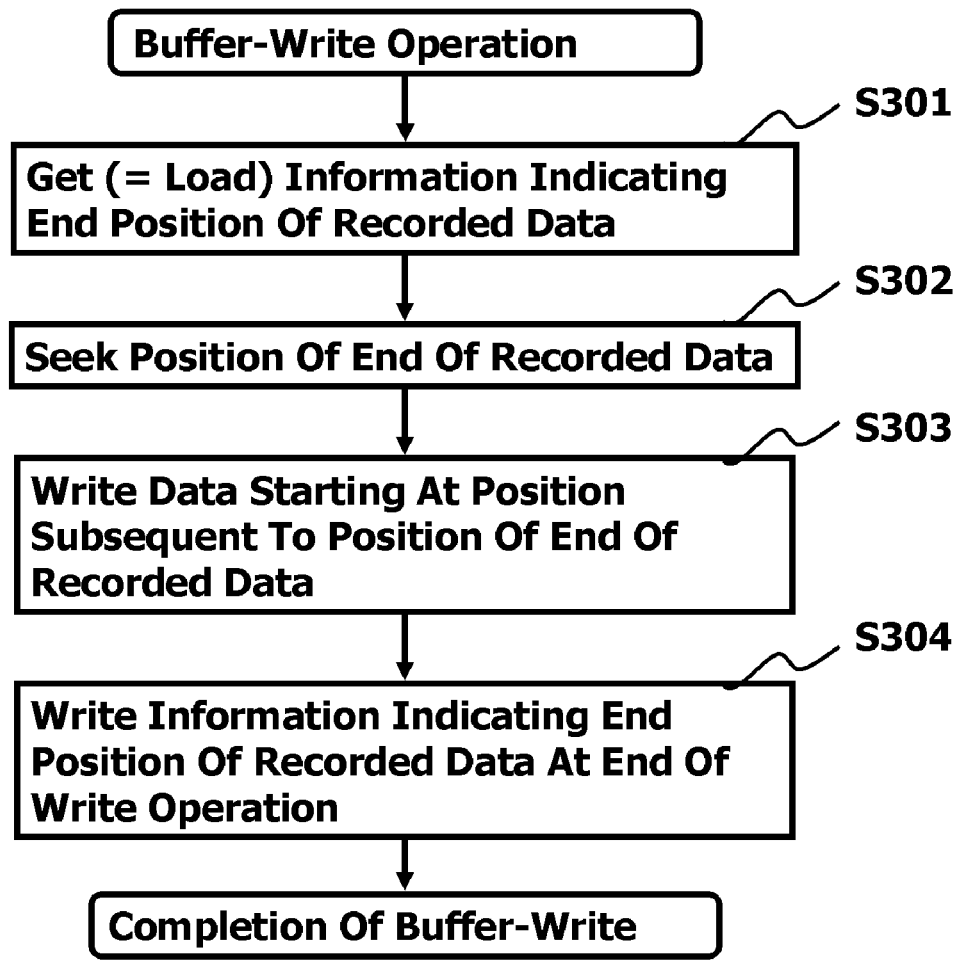

FIG. 5A and FIG. 5B illustrate operation flowcharts of a more preferable operation the one-direction write controller 109 in accordance with the first embodiment, in which the delay-write operation is also supported.

In response to a write request, the hard disk controller 105 of FIG. 1 completes the processing of the write request responsive to the write request at the moment write data is written on the write-buffer region of the buffer memory 106 (step S501 of FIG. 5A).

A buffer write command is issued from the hard disk controller 105 of FIG. 1 to the one-direction write controller 109 every constant period of time. The one-direction write controller 109 performs the actual write operation in the same steps S301-S304 as those in FIG. 3 on the write data in the write-buffer region of the buffer memory 106 within a range defined in the buffer write command (step S301 to step S304 of FIG. 5B).

The successive write control process of FIG. 4 may be included in this process of FIG. 5A and FIG. 5B. As long as no power-interruption nor power-on operation takes place, information (track and sector) related to the position of the end of the recorded data at the end of the preceding write operation remains on a control memory in the one-direction write controller 109 (or in the hard disk controller 105). That remaining information may be used. In such a case, reading the position information at each of the buffer write operations and performing a seek and write operation for each position information updating seem to be too redundant.

While the head (actuator 104 of FIG. 1) of the HDD stays over the magnetic recording medium 101, the position information can be stored on the control memory in the one-direction write controller 109 (or the hard disk controller 105).

A retraction operation to retract the HDD head (actuator 104) from over the magnetic recording medium 101 and a placement operation to place the magnetic recording medium 101 back over the magnetic recording medium 101 are relatively time consuming. Even if the information 201 (FIG. 2) indicating the end position of the recorded data is read or written on the small surface recording density area 103 in the middle of the retraction and placement operations, processing efficiency is not affected in practice.

Figure 6A:
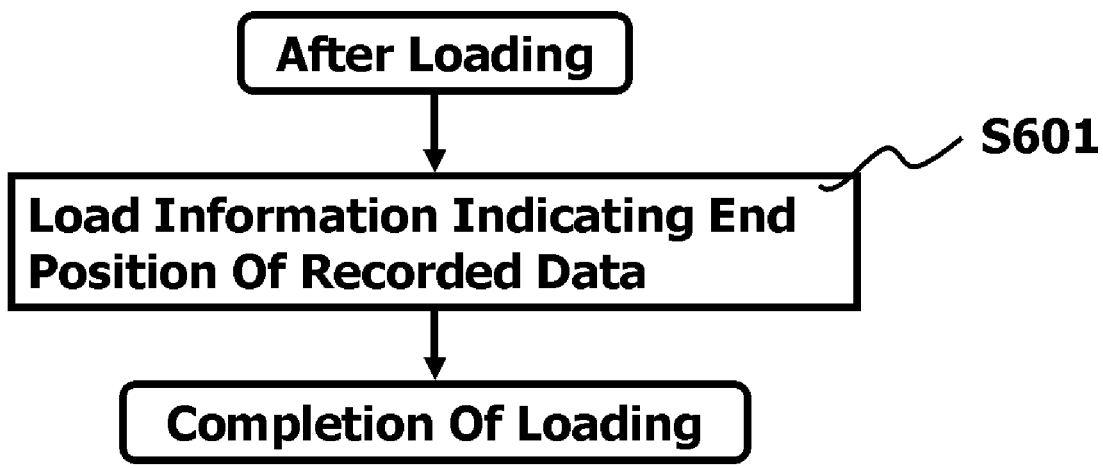
Figure 6B:
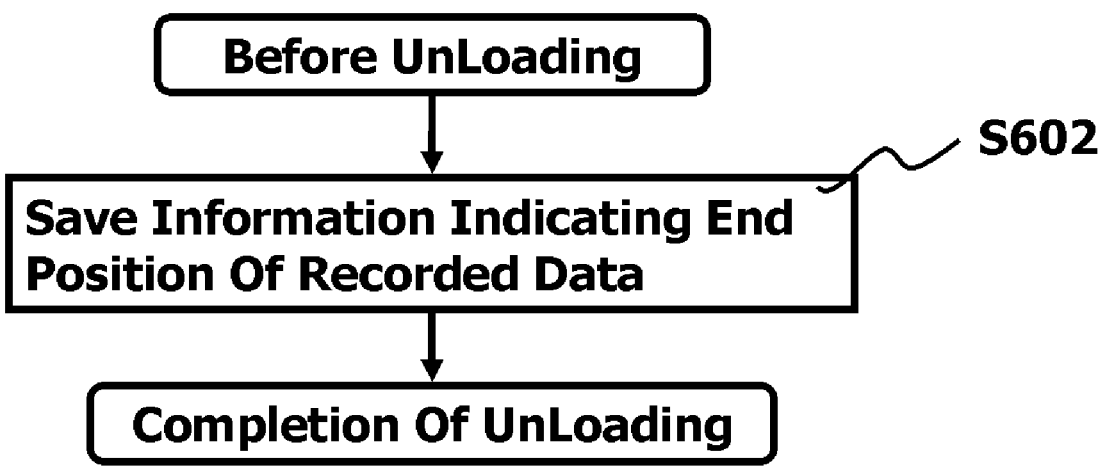

FIG. 6A, FIG. 6B, and FIG. 6C are operation flowcharts of a more preferably operation of the one-direction write controller 109 taking into consideration the above-described operations in accordance with the first embodiment.

Immediately after the actuator 104 of FIG. 1 is placed over the magnetic recording medium 101, the one-direction write controller 109 controls the read head controller 108, thereby loading the information 201 (FIG. 2) indicating the end position of the recorded data from the small surface recording density area 103 to an internal control memory (not shown) (step S601 of FIG. 6A).

Immediately before the actuator 104 is retracted into a retraction area from over the magnetic recording medium 101, the one-direction write controller 109 controls the write head controller 107, thereby saving the information 201 indicating the end position of the recorded data currently stored on the internal control memory onto the small surface recording density area 103 on the magnetic recording medium 101 (step S602 of FIG. 6B).

If a buffer-write command identical to the one shown in FIG. 5A and FIG. 5B are issued every constant period of time from the hard disk controller 105 of FIG. 1 to the one-direction write controller 109, the one-direction write controller 109 of FIG. 1 gets the information indicating the end position of the recorded data stored on the internal control memory (step S603 of FIG. 6C).

The one-direction write controller 109 of FIG. 1 controls the write head controller 107, thereby seeking the head to the position of the end 202 (FIG. 2) of the recorded data on the large surface recording density area 102 on the magnetic recording medium 101 in accordance with the information indicating the end position of the recorded (step S302 of FIG. 6C). This operation is identical to step S302 of FIG. 3.

The one-direction write controller 109 controls the write head controller 107, thereby writing data starting at a position subsequent to the position of the end of the recorded data on the large surface recording density area 102 on the magnetic recording medium 101 (step S303 of FIG. 6C). This operation is identical to step S303 of FIG. 3.

At the end of the write operation, the one-direction write controller 109 puts onto the internal control memory the information indicating the end position of the recorded data (step S604 of FIG. 6C). The data write operation is thus completed (buffer-write completed).

Second Embodiment

Operation of a second embodiment based on the configuration of FIG. 1 is described below. The operation of the first embodiment discussed with reference to FIG. 6A, FIG. 6B, and FIG. 6C are preferable because no redundant seek nor redundant read/write operations are performed on the small surface recording density area 103 on the magnetic recording medium 101. However, the operation of the first embodiment suffers from a lack of consideration to abnormal ending. For example, power may be interrupted on the HDD without performing a normal unloading (retraction) process. At least a special electromagnetic mechanism is usually employed to prevent the head of the HDD from falling on the medium. In accordance with the first embodiment of FIG. 2 in conjunction with the operation flowcharts of FIG. 6A, FIG. 6B, and FIG. 6C, the information 201 indicating the end position of the recorded data may become wrong. There is a possibility that part of the recorded data is missing.

Figure 7:
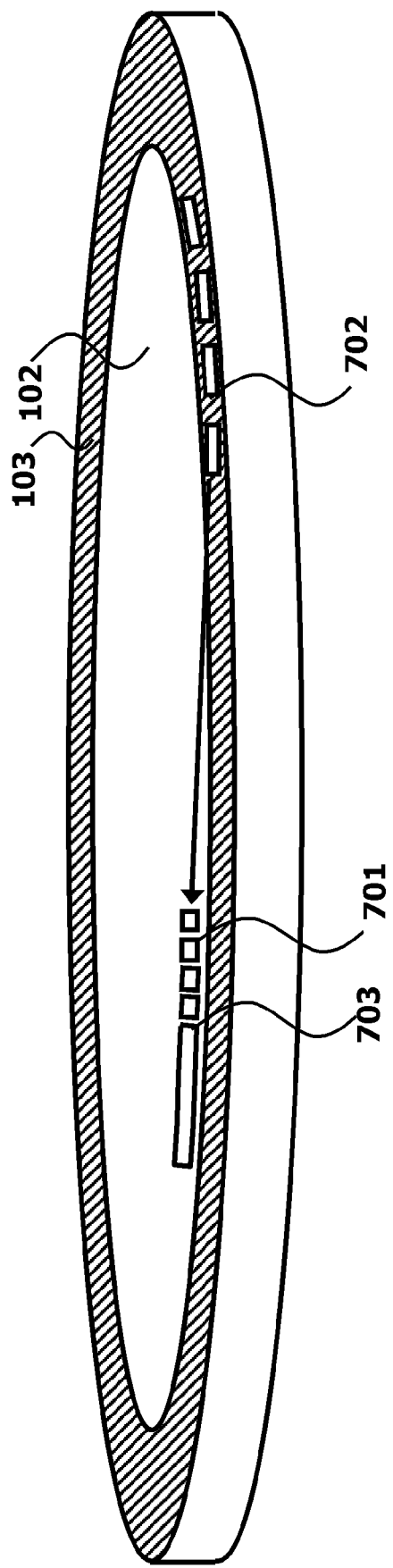
FIG. 7 illustrates a magnetic recording medium in accordance with a second embodiment.

To avoid such a data loss, the second embodiment has a more complex arrangement as shown in FIG. 7. More specifically, an indicating mark is written in order to detect the recorded data. For example, the indicating mark is a marker information 701 indicating the end position of the recorded data. And pointer information 702 points to the marker information 701 indicating the end position 703 of the recorded data is written on the small surface recording density area 103 on the magnetic recording medium 101.

The marker information 701 indicating the end position of the recorded data may be formed as described below. For example, special data patterns represented by a signal having time-axis voltage characteristics of FIG. 8A and frequency-axis power spectrum characteristics (Fourier characteristics) of FIG. 8B, and a signal having time-axis voltage characteristics of FIG. 8C and frequency-axis power spectrum characteristics of FIG. 8D are written for a predetermined period of time or longer as the marker information 701. A common characteristic to a plurality of pieces of marker information 701 is that the number of frequency components contained in the special data patterns is not necessary limited to one.

The length of the special data pattern is about $\frac{1}{12}$ to $\frac{1}{15}$ of a full circle for 10 sectors length, or about one full circle for 150 sectors length on standard HDD.

The one-direction write controller 109 reads the marker information 701 indicating the end position of the recorded data having the special data pattern. More specifically, the one-direction write controller 109 reads the end position of the recorded data from a Fourier output terminal of the read head arranged at the end of the actuator 104 via the read head controller 108 as a peak signal of the signal of FIG. 8A or FIG. 8D.

Figure 9A:
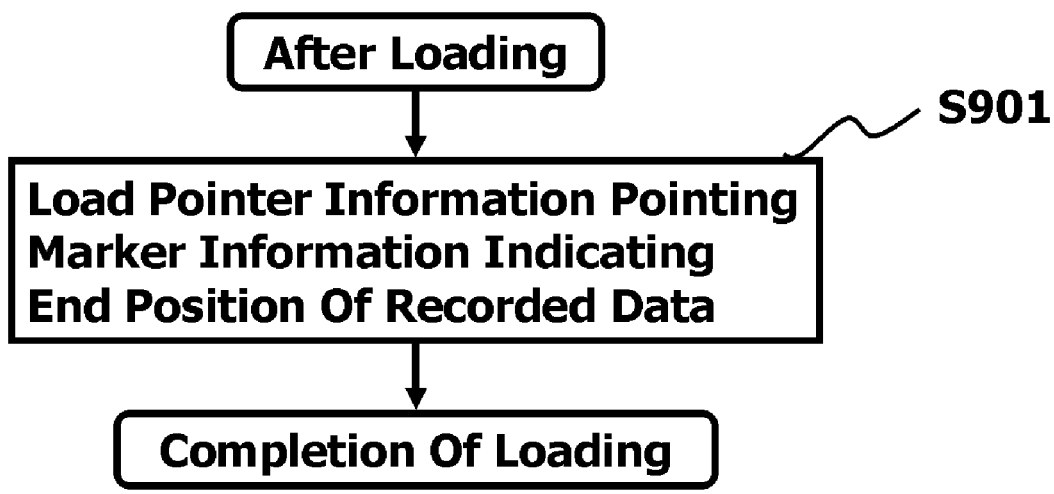
Figure 9B:
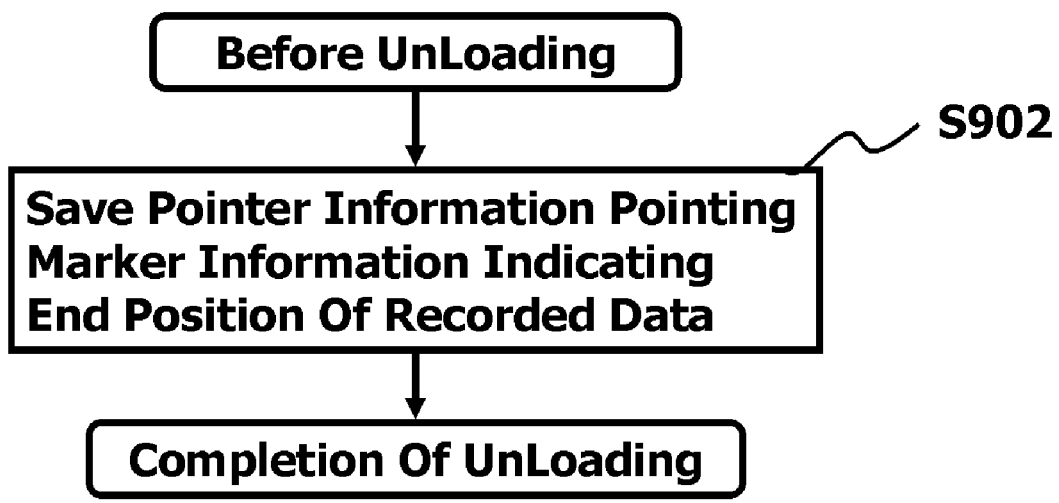

FIG. 9A, FIG. 9B and FIG. 9C are operation flowcharts of operation of the one-direction write controller 109 of FIG. 1 working on the above-described principle in accordance with the second embodiment. Immediately subsequent to the placement of the actuator 104 of FIG. 1 over the magnetic recording medium 101, the one-direction write controller 109 controls the read head controller 108. The read head controller 108 thus loads onto the internal control memory the pointer information 702 (FIG. 7) the marker information 701 indicating the end position of the recorded data from the small surface recording density area 103 (step S901 of FIG. 9A).

Immediately prior to the retraction of the actuator 104 into the retraction area from over the magnetic recording medium 101, the one-direction write controller 109 controls the write head controller 107. The write head controller 107 thus saves the pointer information 702, indicating the end position of the recorded data, currently stored on the internal control memory onto the small surface recording density area 103 on the magnetic recording medium 101 (step S902 of FIG. 9B).

A buffer-write command is issued from the hard disk controller 105 of FIG. 1 to the one-direction write controller 109 every predetermined period of time in the same manner as in FIG. 5A and FIG. 5B. The one-direction write controller 109 of FIG. 1 searches for the marker information 701 indicating the end position of the recorded data on the Fourier output terminal of the read head arranged at the end of the actuator 104 and then detects the marker information 701 as a peak signal of the signal of FIG. 8B or FIG. 8D. The one-direction write controller 109 cross-checks a position indicated by the marker information 701 indicating the end position of the recorded data detected with a position indicated by the pointer information 702 pointing to the marker information indicating the end position of the recorded data stored on the internal control memory (step S903 of FIG. 9C).

If the HDD continuously operates normally, the marker positions match. If the marker positions fail to match, a power interruption unaccompanied by an unload (retraction) operation in step S902 of FIG. 9B may have occurred. A particular step may be performed as necessary. Such a particular step is described later.

The one-direction write controller 109 of FIG. 1 controls the write head controller 107, thereby seeking the head to the position of the end 703 (FIG. 7) of the recorded data on the large surface recording density area 102 on the magnetic recording medium 101 in accordance with the marker information 701 indicating the end position of the recorded data (step S302 of FIG. 9C). This operation is identical to step S302 of FIG. 3.

The one-direction write controller 109 controls the write head controller 107, thereby writing data starting at a position subsequent to the position of the end 703 of the recorded data on the large surface recording density area 102 on the magnetic recording medium 101 (step S303 of FIG. 9C). This operation is identical to step S303 of FIG. 3. The current marker information 701 at that position is overwritten.

At the end of the write operation, the one-direction write controller 109 puts the marker information 701 indicating the end position of the recorded data, at a position subsequent to the end 703 of new recorded data on the large surface recording density area 102 on the magnetic recording medium 101 (step S904 of FIG. 9C). The data write operation is thus completed. The internal control memory stores the pointer information 702 pointing to the marker information indicating the end position of the recorded data.

As previously discussed, immediately after a power interruption unaccompanied by the unload operation in step S902 of FIG. 9B, the position indicated by the marker information 701 indicating the end position of the recorded data detected from the magnetic recording medium 101 fails to match the position indicated by the pointer information 702 pointing to the marker information indicating the end position of the recorded data stored on the internal control memory in step S903 of FIG. 9C. In such a case, the position indicated by the marker information 701 indicating the end position of the recorded data detected from the magnetic recording medium 101 is adopted as information for determining the end 703 of the recorded data with priority. Information that was written on the magnetic recording medium 101 immediately prior to the power interruption and underwent the buffer-write process is thus saved.

Third Embodiment

Operation of a third embodiment based on the configuration of FIG. 1 is described below. If a power interruption occurs on the HDD with the buffer-write operation being in progress, information present in the write-buffer region of the buffer memory 106 (FIG. 1) but not yet written on the magnetic recording medium 101 is definitely lost.

In such a case, the second embodiment can still save information that was written on the magnetic recording medium 101 immediately prior to the power interruption and underwent the buffer-write process. However, a sector having completed the write operation on the magnetic recording medium 101 with the buffer-write process in progress abnormally ends with step S904 of FIG. 9C unexecuted. The end of that sector having undergone the write operation cannot be sought and the sector is lost. The third embodiment saves such a sector.

In accordance with the third embodiment, all the sectors store "mark bits" indicating a "written state" or a "unused state." Immediately after or at the same moment of the data writing, the "written state" overwrites the "unused state."

With this method employed, the data being written on a sector at the moment of the start of the power interruption and data written on subsequent sectors during the power interruption (remaining on the buffer memory 106) are sacrificed, but data on previous sectors down to a sector immediately prior to the sector affected at the start of the power interruption remains normally on the magnetic recording medium 101.

Figure 10:
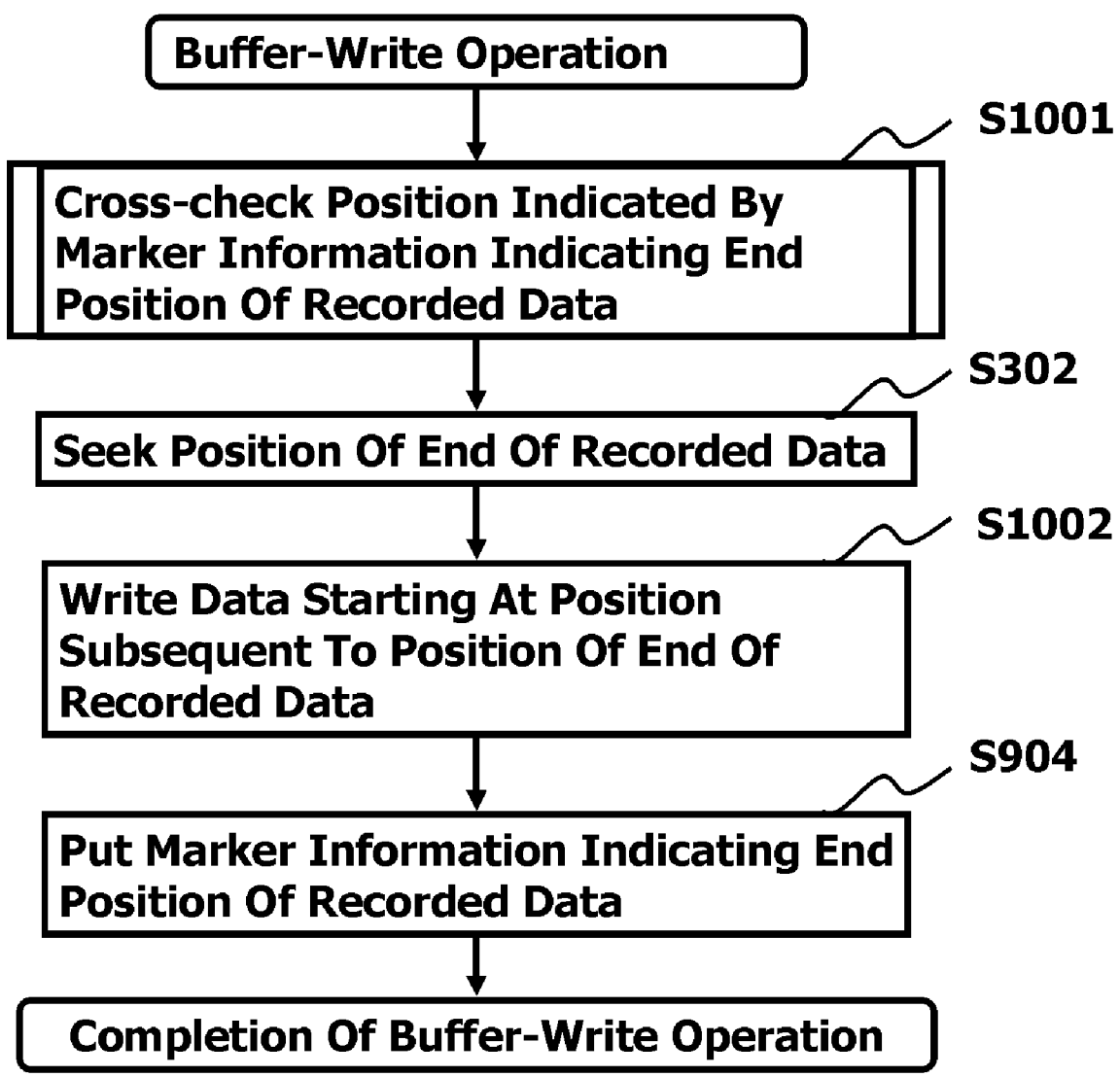
FIG. 10 is an operation flowchart 1 of a third embodiment.
Figure 11A:
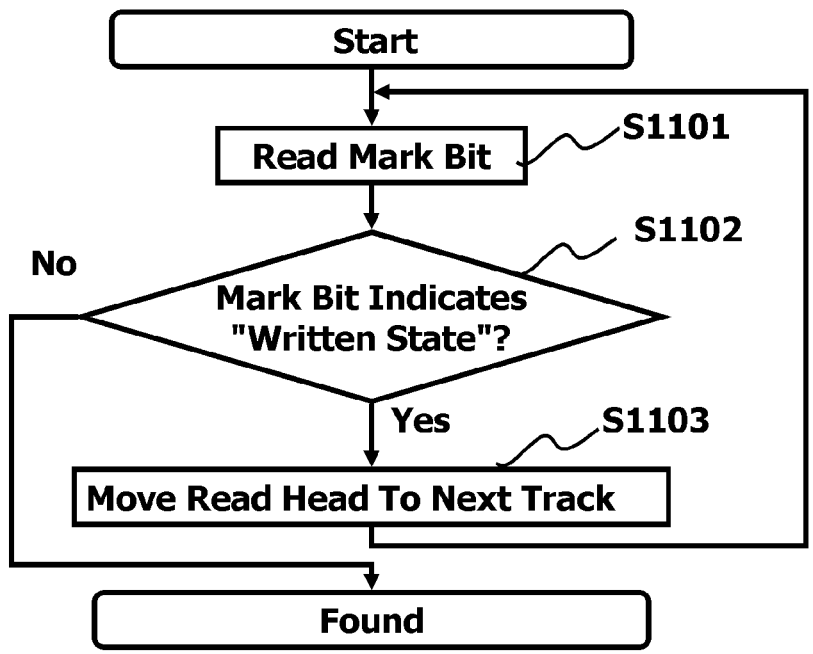
FIG. 11A is an operation flowchart 2 of the search operation of the third embodiment and FIG. 11B describes an explanatory diagram of the search operation.
Figure 11B:
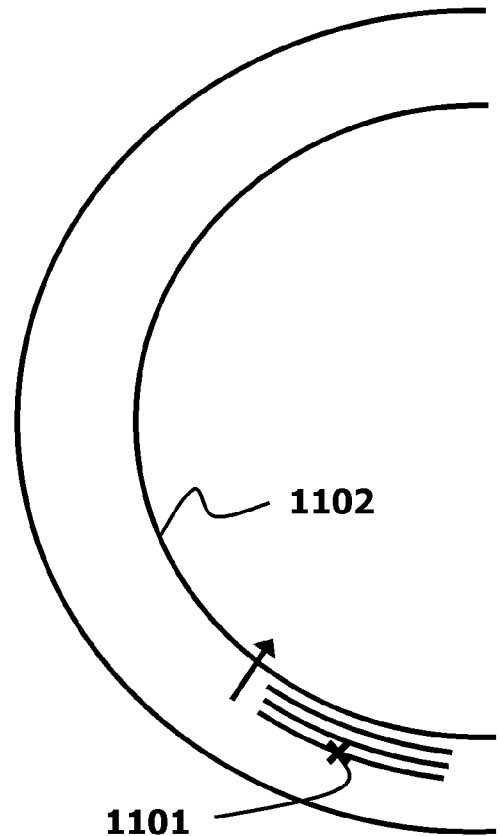

FIGS. 10 and 11A and 11B are operation flowcharts of operations of the one-direction write controller 109 working on the above-described principle in accordance with the third embodiment. The operation flowchart of FIG. 10 is different from the flowchart of FIG. 9C of the second embodiment in that steps S1001 and S1002 are included.

If in step S1001 of FIG. 10 corresponding to step S903 of FIG. 9C, the position indicated by the marker information 701 indicating the end position of the recorded data detected from the magnetic recording medium 101 fails to match the position indicated by the pointer information 702 pointing to the marker information indicating the end position of the recorded data stored on the internal control memory, the end of the recorded data is searched based on mark bit determination in accordance with an operation flowchart of FIG. 11A.

The one-direction write controller 109 controls the read head controller 108. FIG. 11B is an explanatory diagram of the operation. The read head controller 108 thus reads a mark bit of each sector starting at a position 1101 (FIG. 11B) at the end of the recorded data on the magnetic recording medium 101 indicated by the pointer information 702 pointing to the marker information indicating the end position of the recorded data stored on the internal control memory (step S1101).

The one-direction write controller 109 determines whether the mark bit read at each sector indicates the "written state" or not (step S1102). If the determination in step S1102 is yes with the mark bit read at each sector indicating the "written state," the one-direction write controller 109 controls the read head controller 108, thereby moving the read head to a next track (step S1103 of FIG. 11A). The one-direction write controller 109 then reads a mark bit at each sector on the next track (step S1101).

In this way, the one-direction write controller 109 cycles through steps S1101, S1102 (yes), and S1103, and reads and determines the mark bits while moving across the tracks at the same time.

If the determination in step S1102 is no with the mark bit read at each sector not indicating the "written state" in the cycling, the one-direction write controller 109 detects a track 1102 at the end of the actually recorded data illustrated in FIG. 11B in response to the currently processed track.

In step S1002 corresponding to step S303 of FIG. 9C, the one-direction write controller 109 controls the write head controller 107. The write head controller 107 thus writes data starting at a position subsequent to the end position of the recorded on the large surface recording density area 102 on the magnetic recording medium 101. Immediately subsequent to or almost at the same moment of the data writing to each sector, the one-direction write controller 109 re-writes the mark bit at each sector from the "unused state" to the "data written" state.

Fourth Embodiment

Operation of a fourth embodiment based on the configuration of FIG. 1 is described below. In accordance with the third embodiment, the mark bit indicating the "unused state" or the "written state" is stored at each of the data sectors in order not to lose data in the event of a power interruption of the HDD. If the position indicated by the marker information 701 indicating the end position of the recorded data detected from the magnetic recording medium 101 fails to match the position indicated by the pointer information 702 pointing to the marker information indicating the end position of the recorded data stored on the internal control memory, the end of the recorded data is searched based on the mark bit determination.

In contrast, the fourth embodiment is free from the marker information 701 indicating the end position of the recorded data on the large surface recording density area 102 and the pointer information 702 pointing to the marker information indicating the end position of the recorded data on the small surface recording density area 103. In accordance with the fourth embodiment, the end position of the recorded data is searched with reference to the mark bit only.

In the operation of the fourth embodiment, the process at the load (placement)/unload (retraction) operations becomes unnecessary. FIG. 12 is an operation flowchart of an operation performed in response to a buffer write command by the one-direction write controller 109 of FIG. 1 in accordance with the fourth embodiment.

The one-direction write controller 109 searches for a mark bit indicating the end position of the recorded data on the large surface recording density area 102 on the magnetic recording medium 101. This process may be performed in the operation flowchart of FIG. 11A in accordance with the third embodiment. More preferably, the process may be performed in a binary search method of FIG. 13A. A variety of other search methods are contemplated.

Figure 13A:
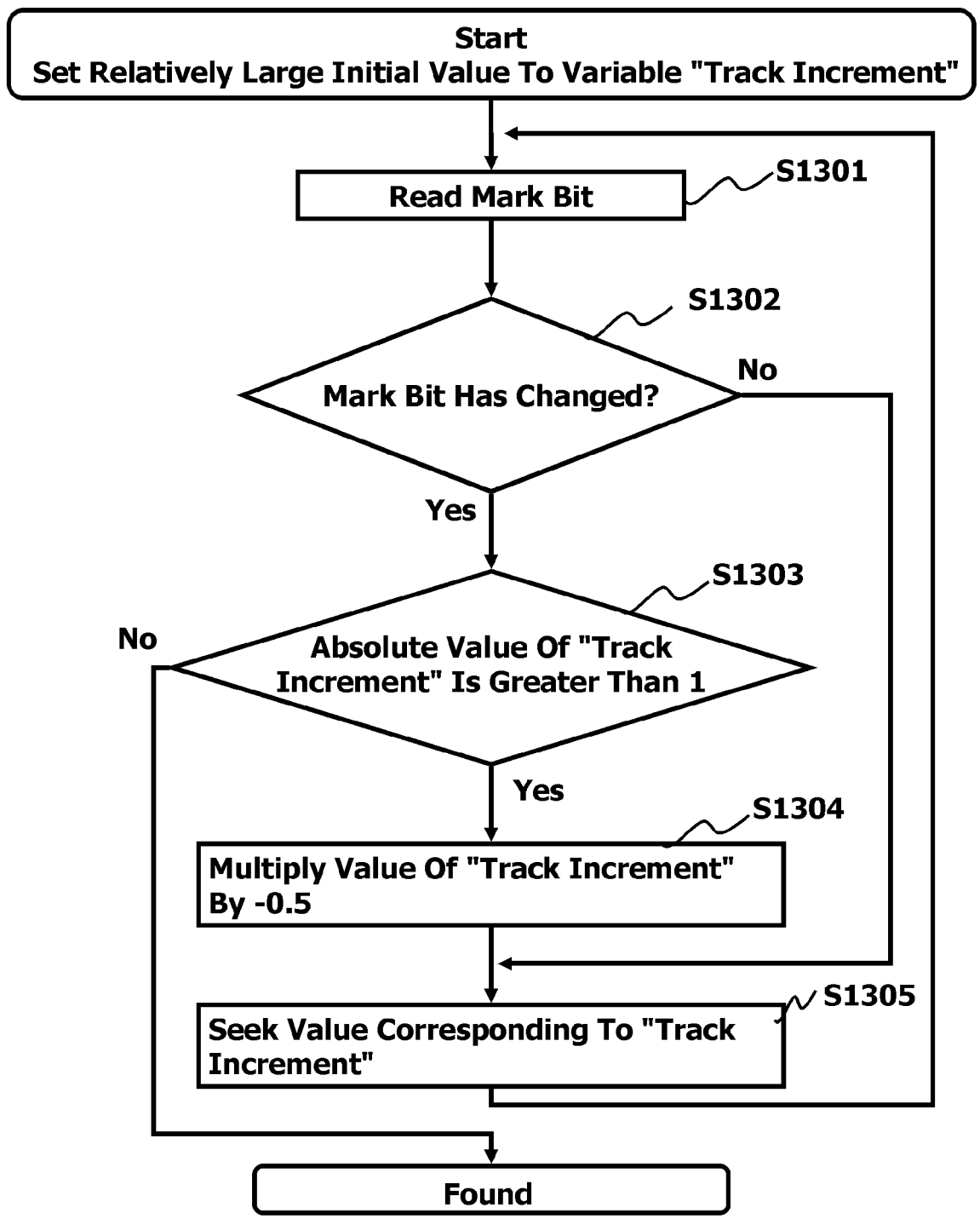
FIG. 13A is an operation flowchart of the search operation of an end position of recorded data in accordance with the fourth embodiment and FIG. 13B describes an explanatory diagram of the search operation.

In the operation flowchart of FIG. 13A, the one-direction write controller 109 sets a relatively large initial value to a variable "track increment" and then controls the read head controller 108, thereby reading a mark bit at each sector starting at a head position of the large surface recording density area 102 on the magnetic recording medium 101 (step S1301).

The one-direction write controller 109 determines whether the state indicated by the mark bit read from the sector has changed from the state determined at one cycle earlier (step S1302). The mark bit begins with the "written state" and that state does not change at first.

Figure 13B:
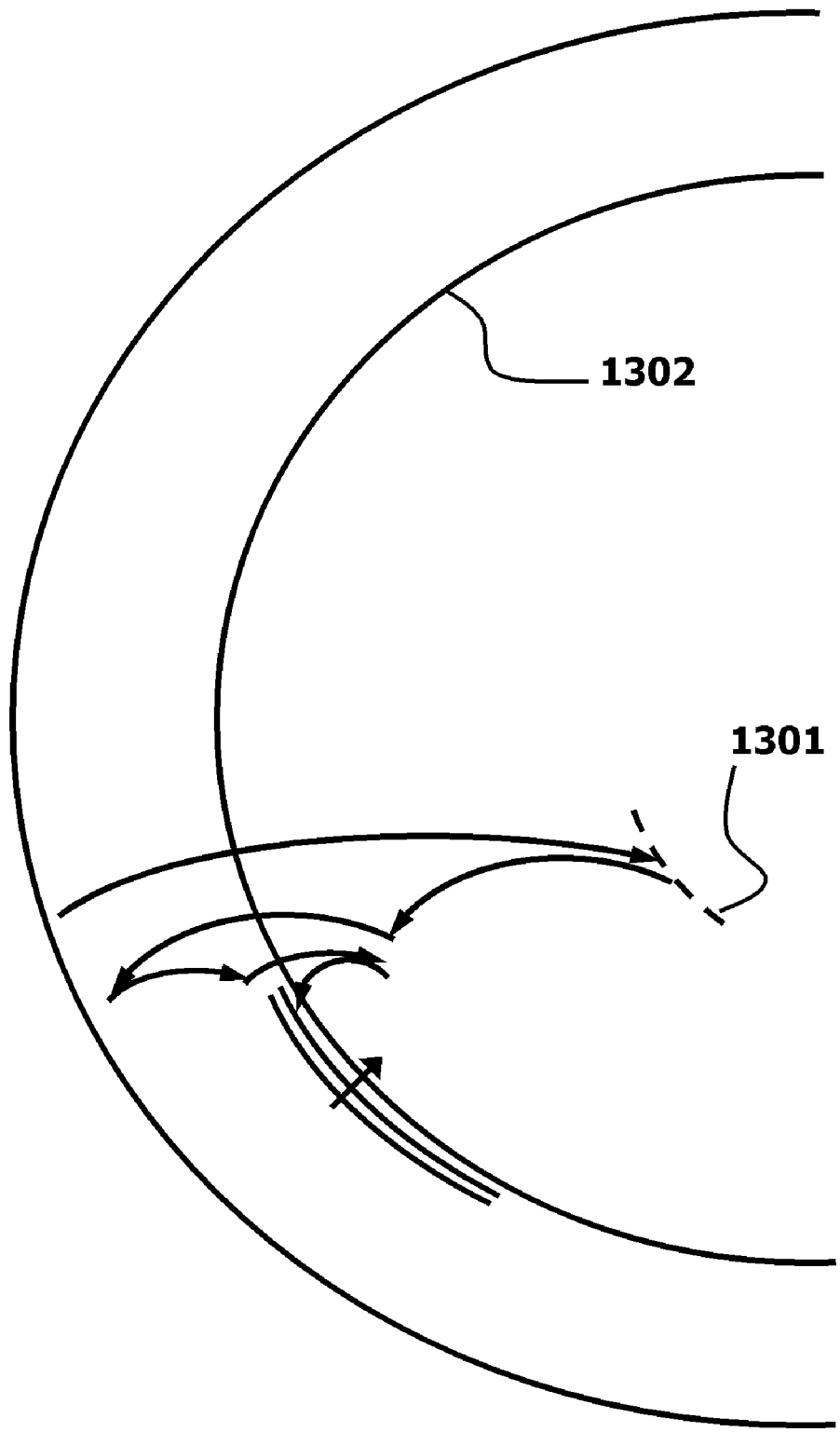

As a result, the determination result in step S1302 is no. The one-direction write controller 109 then controls the read head controller 108, thereby controlling the read head to seek a track spaced by an amount corresponding to the variable "track increment" (step S1305). FIG. 13B describes an explanatory diagram of the search operation. The head thus moves to the track by a relatively large amount of shift (1301 of FIG. 13B).

The one-direction write controller 109 reads the bit mark at each sector at the track at the seek destination (step S1301), and determines the state at the mark bit (step S1302). If no change is detected in the mark bit, a track seek corresponding to the variable "track increment" is performed (step S1305).

The one-direction write controller 109 reads the bit mark at each sector at the track at the seek destination (step S1301), and determines the state at the mark bit (step S1302). If the state is changed from the "written state" to the "unused state," the result of the determination in step S1302 is yes. The one-direction write controller 109 determines whether the absolute value of the variable "track increment" is greater than 1 (step S1303). If the determination result in step S1303 is yes, the one-direction write controller 109 multiplies the value of the variable "track increment" by −0.5 (step S1304). The one-direction write controller 109 then performs a track seek operation by a value corresponding to the variable "track increment" set to be moved in an opposite direction (step S1305).

Each time the state of the detected mark bit changes, the one-direction write controller 109 halves and reverse-signs the variable "track increment" in order to reduce the track shifting in size and alternate the track shifting in direction. The one-direction write controller 109 converges positions changing in the mark bit state to a point (shifting from 1301 to 1302 in FIG. 13B).

The one-direction write controller 109 detects as the end position of the recorded data a position where the state of the mark bit finally changes with the value of the variable "track increment" being 1 (with the determination result in step S1302 being yes and then the determination result in step S1303 being no).

The binary search method can search for the end position of the recorded data at a high speed. A variety of other search methods are contemplated. With reference back to the operation flowchart of FIG. 12, if the end position of the recorded data is detected based on the mark bit in step S1201, the one-direction write controller 109 controls the write head controller 107. The write head controller 107 thus seeks the head to the end position of the recorded data on the large surface recording density area 102 on the magnetic recording medium 101 (step S302 of FIG. 12). This operation is identical to step S302 of FIG. 3.

The one-direction write controller 109 controls the write head controller 107, thereby writing data starting at a position subsequent to the end position of the recorded data on the large surface recording density area 102 on the magnetic recording medium 101 (step S1002 of FIG. 12). Immediately subsequent to or almost at the same moment of the data writing on each sector, the write head controller 107 re-writes the mark bit stored for the sector from the "unused state" to the "written state." This operation is identical to step S1002 of FIG. 10.

At the end of the write operation, the one-direction write controller 109 updates position information of the mark bit indicating the end position of the recorded data on the internal control memory (step S1202 of FIG. 12).

In the event of a power interruption, the above-described process with only the mark bit search saves the data on the sector on the magnetic recording medium 101 that underwent the write operation immediately prior to the power interruption. In the operation of the fourth embodiment illustrated in FIG. 12, the mark bit on the large surface recording density area 102 is determined each time the buffer write command is generated. The end position of the recorded data is then searched. Alternatively, the mark bit search may be performed only when the actuator 104 of FIG. 1 is placed over the magnetic recording medium 101.

Figure 14A:
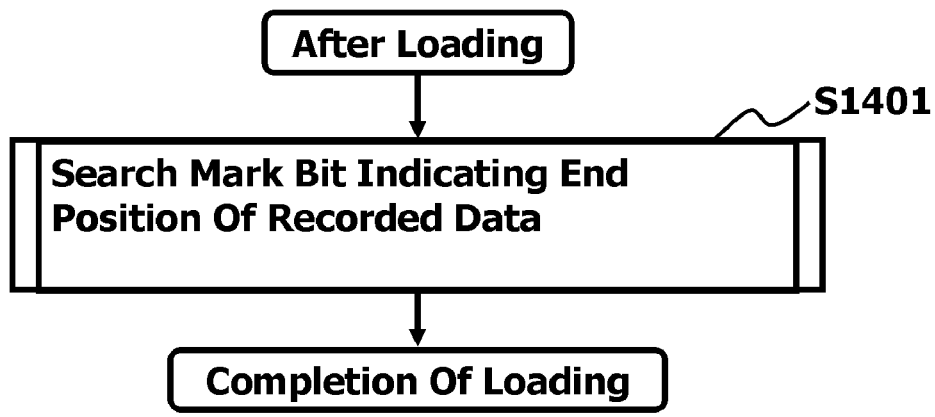
FIG. 14A and FIG. 14B are operation flowcharts 2 of the fourth embodiment.
Figure 14B:
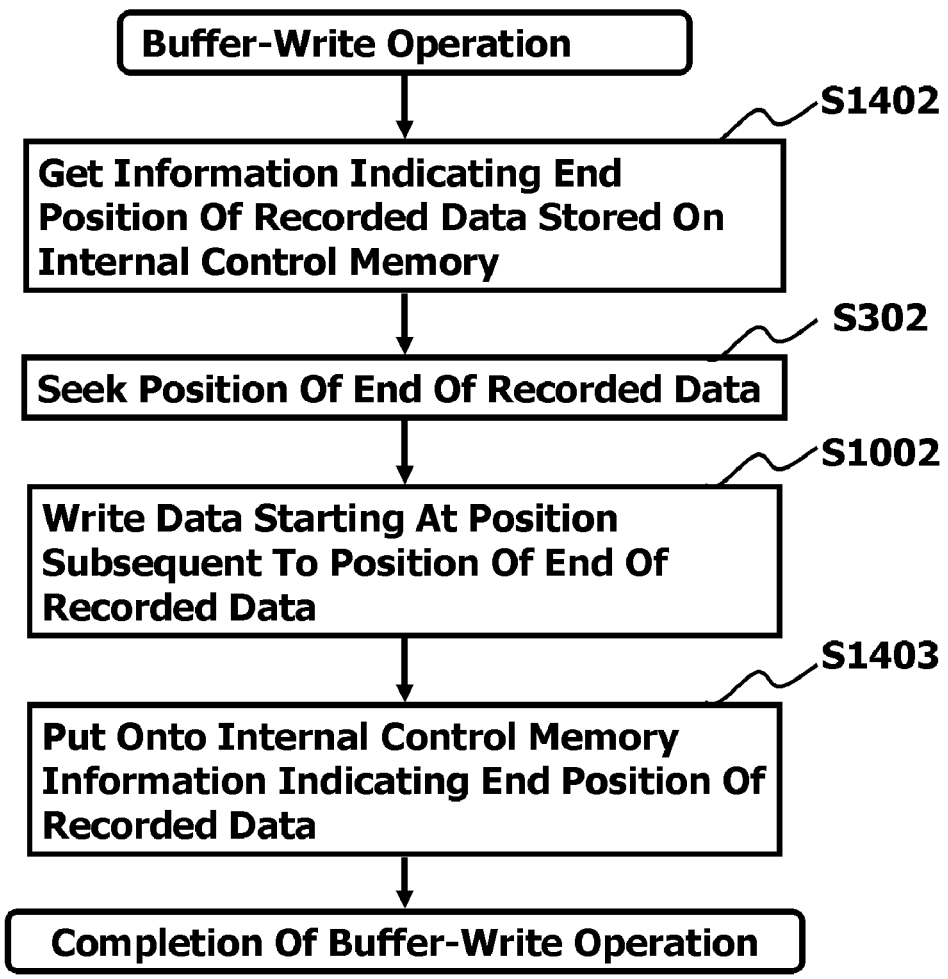

FIG. 14A and FIG. 14B are operation flowcharts of a more preferable operation of the one-direction write controller 109 in accordance with the fourth embodiment taking into the above-described mark bit search method. Immediately after the actuator 104 of FIG. 1 is placed over the magnetic recording medium 101, the one-direction write controller 109 controls the read head controller 108, thereby searching for the mark bit indicating the end position of the recorded data (step S1401 of FIG. 14A). This operation is identical to step S1201 of FIG. 12. Upon detecting the mark bit indicating the end position of the recorded data, the one-direction write controller 109 stores information of the position of the mark bit onto the internal control memory.

When a buffer-write command is issued from the hard disk controller 105 of FIG. 1 to the one-direction write controller 109, the one-direction write controller 109 gets information indicating the end position of the recorded data stored on the internal control memory (step S1402).

The one-direction write controller 109 controls the write head controller 107, thereby seeks the head to the end position of the recorded data on the large surface recording density area 102 on the magnetic recording medium 101 (step S302 of FIG. 14B). This operation is identical to step S302 of FIG. 12.

The one-direction write controller 109 controls the write head controller 107, thereby writing data starting at a position subsequent to the end position of the recorded data on the large surface recording density area 102 on the magnetic recording medium 101 (step S1002 of FIG. 14B). Immediately subsequent to or almost at the moment of the data writing on each sector, the one-direction write controller 109 re-writes the mark bit stored on the sector from the "unused state" to the "written state." This operation is identical to step S1002 of FIG. 12.

When the write operation is complete, the one-direction write controller 109 updates the information indicating the end position of the recorded data on the internal control memory (step S1403 of FIG. 14B).

As long as power remains uninterrupted, the one-direction write controller 109 determines a head position of next writing based on the information indicating the end position of the recorded data successively stored on the internal control memory in step S1403 of FIG. 14B, each moment the buffer write command occurs. As a result, a high-speed process responsive to the buffer write command is executed.

In addition, the position of the mark bit may be allocated other than the position subsequent to the end position of the recorded data on the large surface recording density area 102 on the magnetic recording medium 101. For example, the mark bit may be allocated to the first of the sector. When the mark bit may be allocated to the first of the sector, the one-direction write controller 109 controls the write head controller 107, thereby writing the data. Next, the one-direction write controller 109 waits until rotating about one full circle. Next, the one-direction write controller 109 controls the write head controller 107, thereby updating the mark bit corresponding to the recorded data.

Fifth Embodiment

Operation of a fifth embodiment based on the configuration of FIG. 1 is described below. The first through fourth embodiments relate to the technique of searching for the end position of the recorded data in accordance with any type of mark. The fifth embodiment relates to a technique of searching for the end position of the recorded data without using such additional information.

Figure 15A:
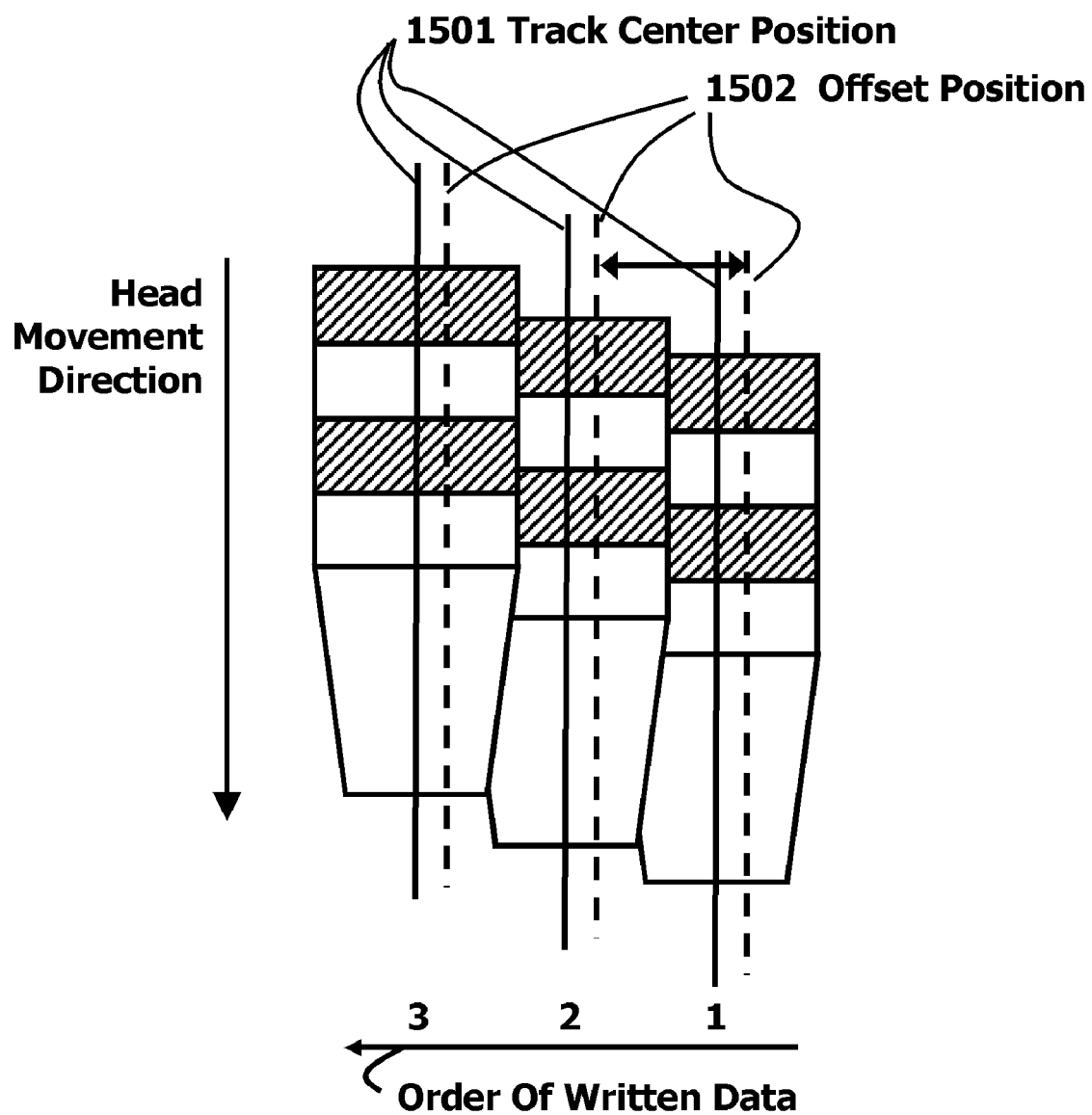
FIG. 15A illustrates an explanatory diagram of the search operation and FIG. 15B is an operation flowchart of a search operation of an end position of recorded data in accordance with a fifth embodiment.

FIG. 15A illustrates an explanatory diagram of the search operation. In the one-direction writing operation, data is written on tracks in a fixed order (for example, (1), (2), and (3) of FIG. 15A) with three tracks arranged in the direction of movement of a head as shown in FIG. 15A. Writing is performed with one track partly overlapping an immediately preceding written track.

In the reading operation of reading data that has been written in the manner described above, a maximum output is obtained at an offset position 1502 offset rightward from a track center position 1501 in each of tracks (1) and (2) of FIG. 15A. In track (3), however, a maximum output is obtained at a track center 1501.

Figure 15B:
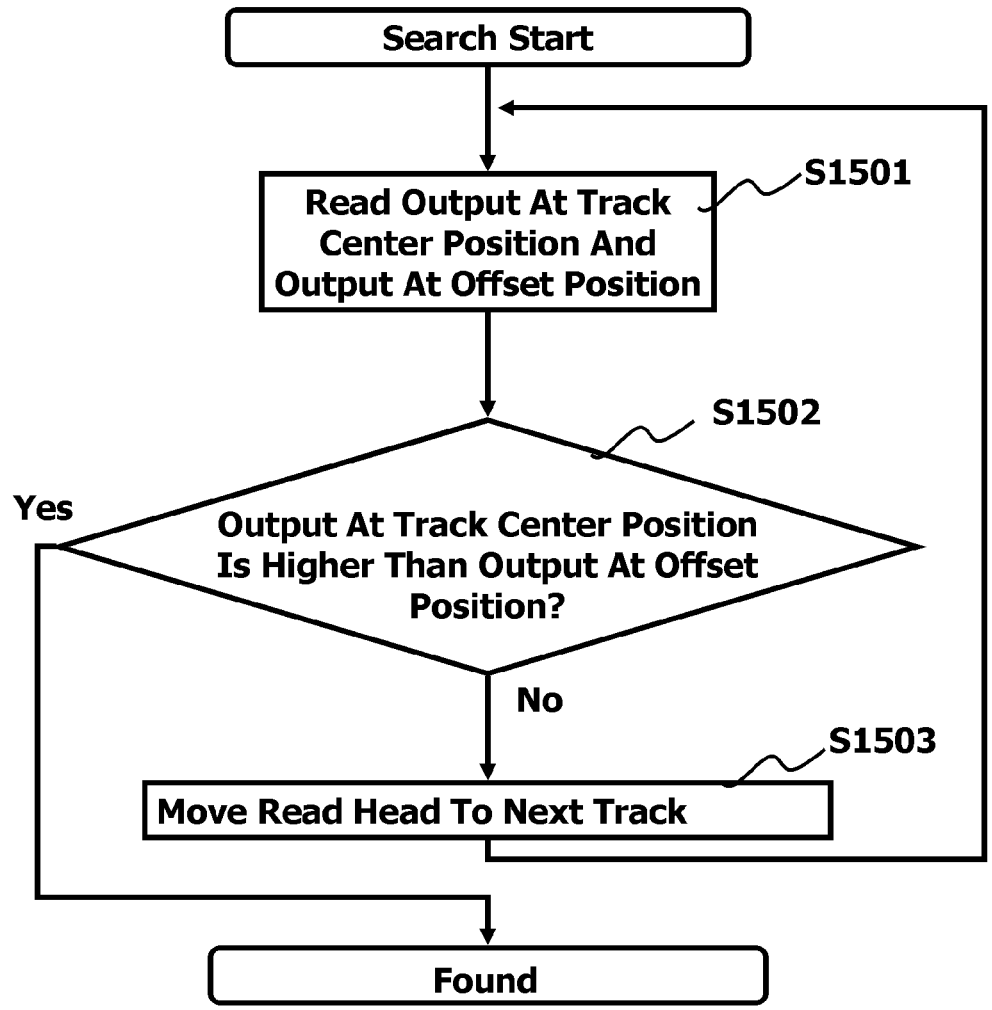

FIG. 15B is an operation flowchart of operation of the one-direction write controller 109 of FIG. 1 that detects the end position of the recorded data taking advantage of the above-described property. The one-direction write controller 109 controls the read head controller 108, thereby reading an output at the track center position 1501 and an output at the offset position 1502 at a start track (step S1501).

The one-direction write controller 109 determines whether the output at the track center position 1501 is higher than the output at the offset position 1502 (step S1502). If the determination result in step S1502 is no, the one-direction write controller 109 determines that a current track is not a final track containing the end position of the recorded data (corresponding to one of the tracks (1) and (2)). The one-direction write controller 109 then shifts to a next track (step S1503), and then returns to step S1501.

If the determination result in step S1501 is yes with the output at the track center position 1501 becoming higher than the output at the offset position 1502, the one-direction write controller 109 determines that the current track is the final track containing the end position of the recorded data (corresponding to the track (3) of FIG. 15A). The one-direction write controller 109 has thus successfully detected the end position of the recorded data.

In accordance with the fifth embodiment, the end position of the recorded data is searched without any additional information. The search process may be performed in response to each of the executions of the buffer command as in step S1201 of FIG. 12 or only when the actuator 104 of FIG. 1 is placed over the magnetic recording medium 101 as in step S1401 of FIG. 14A.

Sixth Embodiment

Operation of a sixth embodiment based on the configuration of FIG. 1 is described below. The sixth embodiment is an improvement of the fourth embodiment in that the mark bit is not used in the search of the end position of the recorded data with the actuator 104 of FIG. 1 placed over the magnetic recording medium 101.

Figure 16:
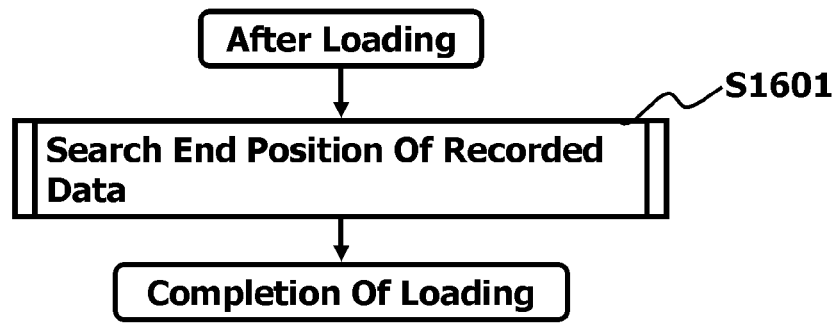
FIG. 16 is an operation flowchart of a sixth embodiment.

FIG. 16 is an operation flowchart of operation of the one-direction write controller 109 of FIG. 1 using no mark bit in the search of the end position of the recorded data.

Figure 17:
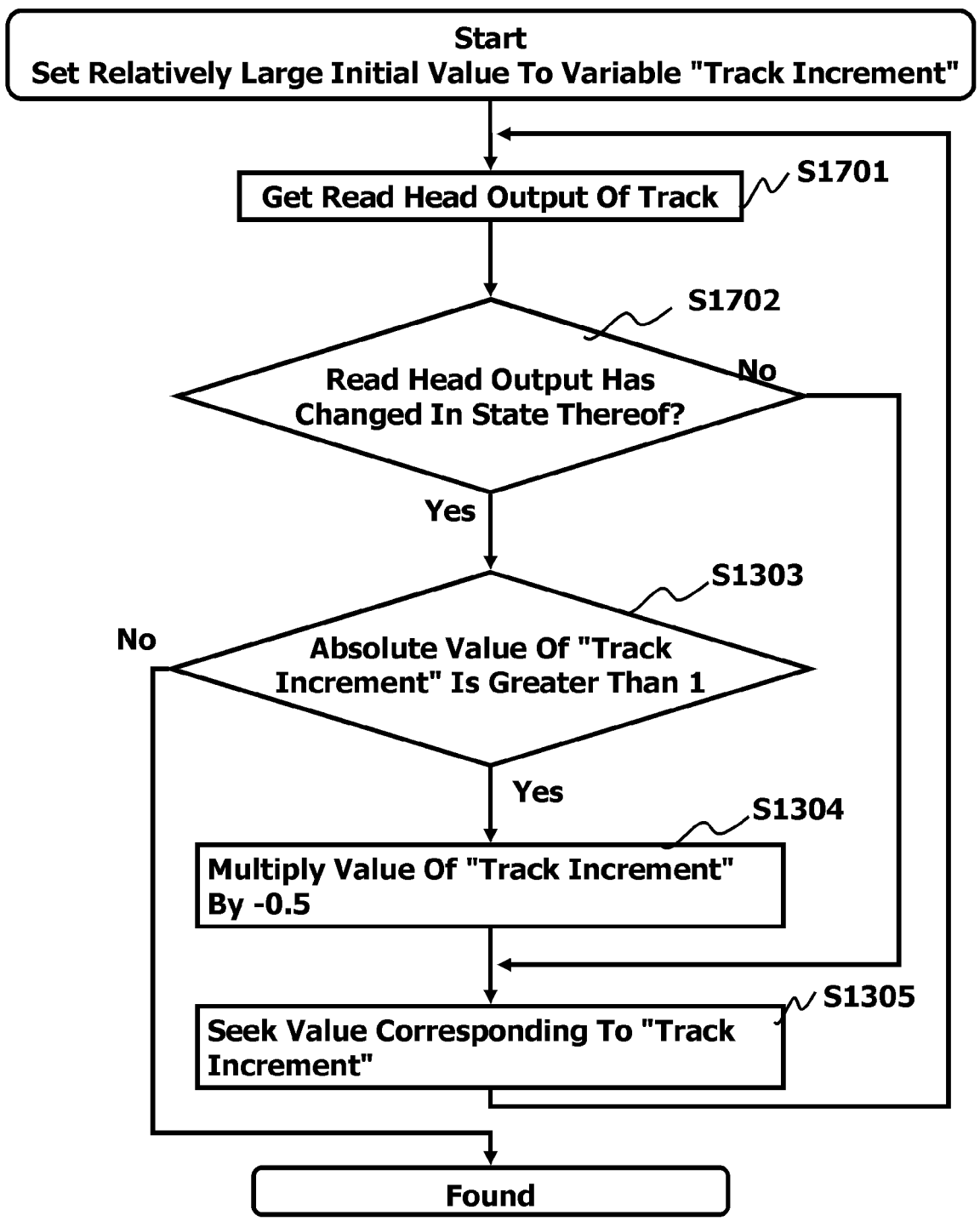
FIG. 17 is an operation flowchart of a search operation of an end position of recorded data in accordance with the sixth embodiment.

Steps S1402, S302, S1002, and S1403 performed in response to the buffer write command are identical to the counterparts of FIG. 14B. In step S1601 of FIG. 16, the search process of the end position of the recorded data represented in the operation flowchart of FIG. 17 is performed. The operation flowchart of FIG. 17 is performed in the same algorithm as the binary search method of FIG. 13A.

In the operation flowchart of FIG. 17, the one-direction write controller 109 sets a relatively large initial value to a variable "track increment" and then controls the read head controller 108, thereby getting an output at the read head at a head track position of the large surface recording density area 102 on the magnetic recording medium 101 (step S1701).

The one-direction write controller 109 determines whether the read head output has changed in the state thereof (step S1702). The head output level at a data recorded track is a high absolute value and the head output level at a unrecorded track is an extremely low absolute value. The mark bit begins with the "written state" and that state does not change at first.

As a result, the determination result in step S1702 is no. The one-direction write controller 109 then controls the read head controller 108, thereby controlling the read head to seek a track spaced by an amount corresponding to the variable "track increment" (step S1305 of FIG. 17). The head thus moves to the track by a relatively large amount of shift. This operation is identical to step S1305 of FIG. 13A.

The one-direction write controller 109 reads the head output at the track at the seek destination (step S1701), and determines the state at the head output (step S1702 of FIG. 17). If no change is detected in the head output, a track seek corresponding to the variable "track increment" is performed (step S1305 of FIG. 17).

The one-direction write controller 109 reads the head output at the track at the seek destination (step S1701), and determines the state at the head output (step S1702 of FIG. 17). If the absolute output value of the head output changes from the "written state" to the "unused state," the determination result in step S1702 becomes yes. The one-direction write controller 109 determines whether the absolute value of the variable "track increment" is greater than 1 (step S1303). If the determination result in step S1303 is yes, the one-direction write controller 109 multiplies the value of the variable "track increment" by −0.5 (step S1304 of FIG. 17). The one-direction write controller 109 then performs a track seek operation by a value corresponding to the variable "track increment" set to be moved in an opposite direction (step S1305 of FIG. 17). Steps S1303 and S1304 in FIG. 17 are identical to the counterparts in FIG. 13A.

Each time the state of the detected head output changes, the one-direction write controller 109 halves and reverse-signs the variable "track increment" in order to reduce the track shifting in size and alternate the track shifting in direction. The one-direction write controller 109 converges positions changing in the output state of the head (absolute value) to a point.

The one-direction write controller 109 detects as the end position of the recorded data a position where the state of the mark bit finally changes with the value of the variable "track increment" being 1 (with the determination result in step S1702 being yes and then determination result in step S1303 being no).

The binary search method can search for the end position of the recorded data at a high speed without using the additional information such as the mark bit. A variety of other search methods are contemplated.

In the same manner as in step S1201 of FIG. 12, the search process of the end position of the recorded data based on the head output may be performed when the buffer write command is executed.

Seventh Embodiment

Operation of a seventh embodiment based on the configuration of FIG. 1 is described below. Handled by the HDD for computers or other apparatuses such as video camera and video recorders include "content data" that basically does not need data rewriting, and "non-content data" that needs data rewriting.

More specifically, the content data is simply accumulated data such as a moving image, a still image, music, or operation records (log data) of machines, programs, human activity, and society or data of a type that does not essentially need rewrite of information.

The non-content data includes information related to operating systems (OS's) (directory information, registry, configuration, etc.), information related to program (a variety of operation setting information, program binary code, source code, etc.), fixed document information (word processed documents, table calculation files, presentation files, personal information management (PIM) files, etc.). The non-content data is rewritten in any way.

Figure 18:
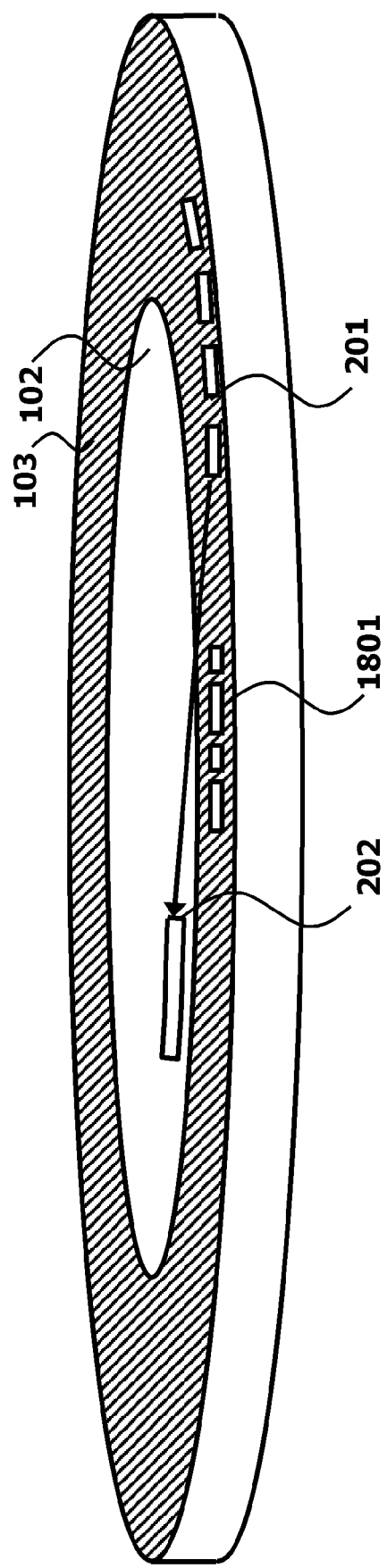
FIG. 18 illustrates a first recording format of a recording medium in accordance with a seventh embodiment.

FIG. 18 illustrates a first recording format of the magnetic recording medium 101 in accordance with the seventh embodiment. The content data is recorded on the one-direction write only, large surface recording density area 102. The non-content data is recorded on the random-write small surface recording density area 103. The magnetic recording medium 101 of FIG. 18 is different from the magnetic recording medium 101 of FIG. 2 in that the small surface recording density area 103 is wider than the small surface recording density area 103 of FIG. 2 so that the non-content data is recorded depending on applications. In this embodiment, non-contents data indicates rewritable data.

In the same manner as shown in FIG. 2, the small surface recording density area 103 of FIG. 18 has the information 201 indicating the end position of the recorded data in order to identify an end position 202 of the recorded data on the large surface recording density area 102. Non-content data 1801 is recorded on the small surface recording density area 103.

Figure 19:
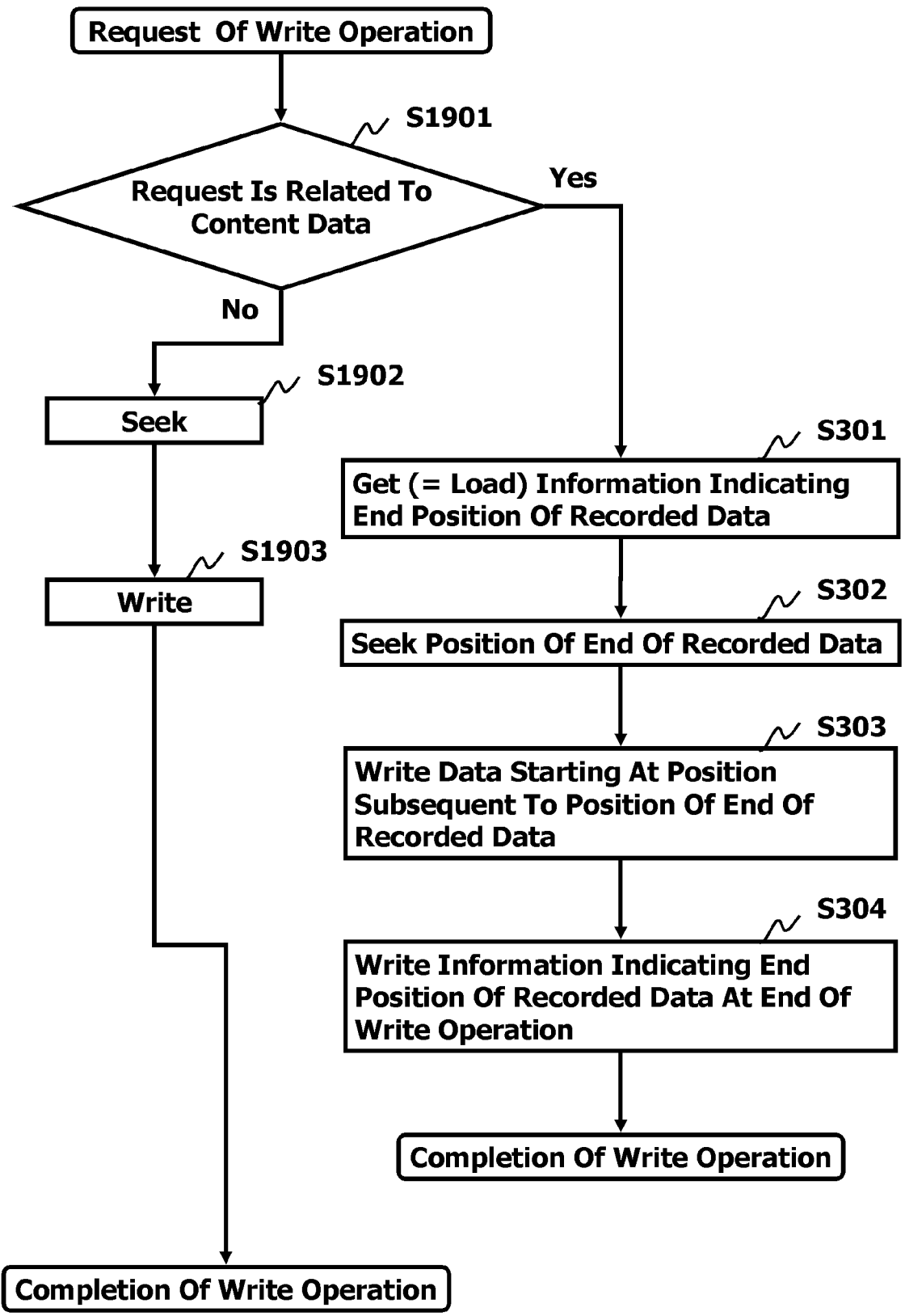
FIG. 19 is an operation flowchart of the first recording format of the recording medium in accordance with the seventh embodiment.

FIG. 19 is an operation flowchart of operation of the one-direction write controller 109 of FIG. 1 supporting the recording format of FIG. 18. In that operation flowchart, the control process of the first embodiment is also combined.

In response to a write request (or a buffer-write request) from the hard disk controller 105, the one-direction write controller 109 determines whether the request is related to the content data (step S1901 of FIG. 19).

If the determination result in step S1901 is yes with the request being related to the content data, the one-direction write controller 109 performs the same operations as those in steps S301-S304 of FIG. 3 in accordance with the first embodiment. An efficient one-direction writing is thus performed in the same manner as in the first embodiment.

If the determination result in step S1901 is no with the request being related to the non-content data, the one-direction write controller 109 controls the write head controller 107. The write head controller 107 thus performs a standard random seek operation on the small surface recording density area 103 on the magnetic recording medium 101 (step S1902 of FIG. 19), and writes the non-content data from the buffer memory 106 onto the position sought in the random seek operation (step S1903 of FIG. 19). The non-content data is thus recorded without any problems.

Figure 20:
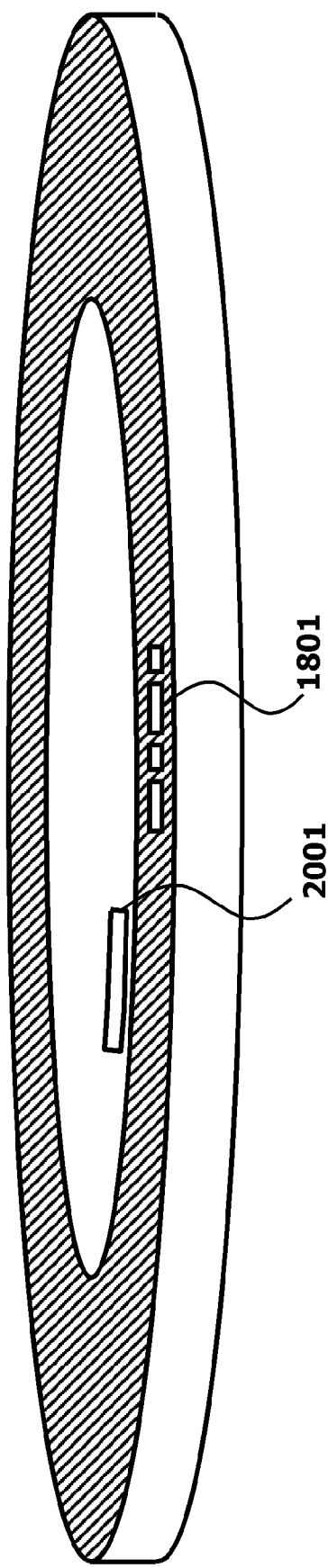
FIG. 20 illustrates a second recording format of the recording medium in accordance with the seventh embodiment.

FIG. 20 illustrates a second recording format on the magnetic recording medium 101 in accordance with the seventh embodiment. In the same manner as in the case of FIG. 18, the content data is recorded on the one-direction write only, large surface recording density area 102. The non-content data is recorded on the random-write small surface recording density area 103. In addition to the same non-content data 1801 as the one in FIG. 18, drive control data that is to be random accessed as necessary is also recorded on the small surface recording density area 103. In accordance with the seventh embodiment, an end 2001 of the recorded content data on the large surface recording density area 102 is calculated from only the mark bit recorded on each sector of the content data on the large surface recording density area 102 without using the information 201 indicating the end position of the recorded data on the small surface recording density area 103 illustrated in FIG. 19.

Figure 21:
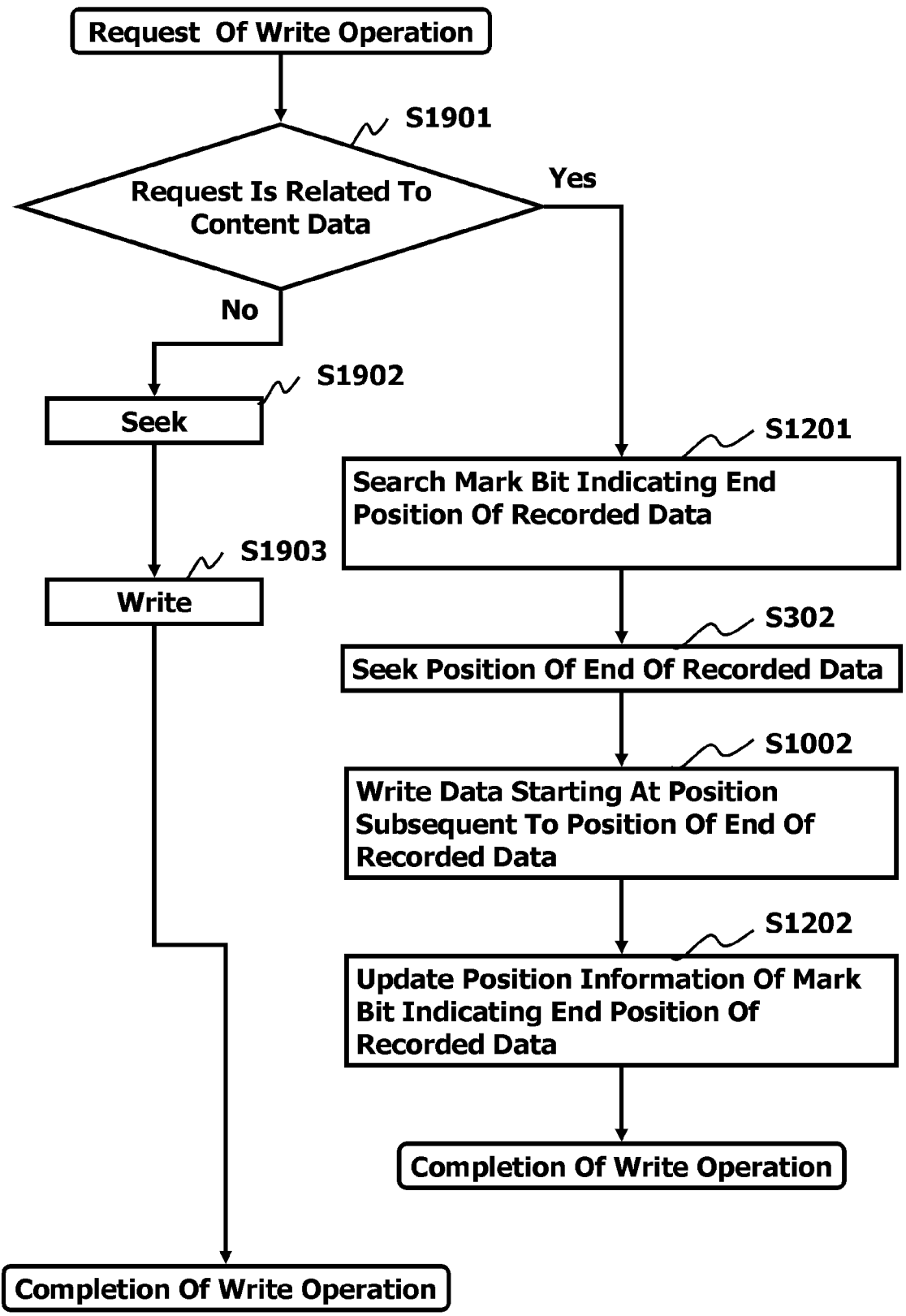
FIG. 21 is an operation flowchart of the second recording format of the recording medium in accordance with the seventh embodiment.
Figure 22A:
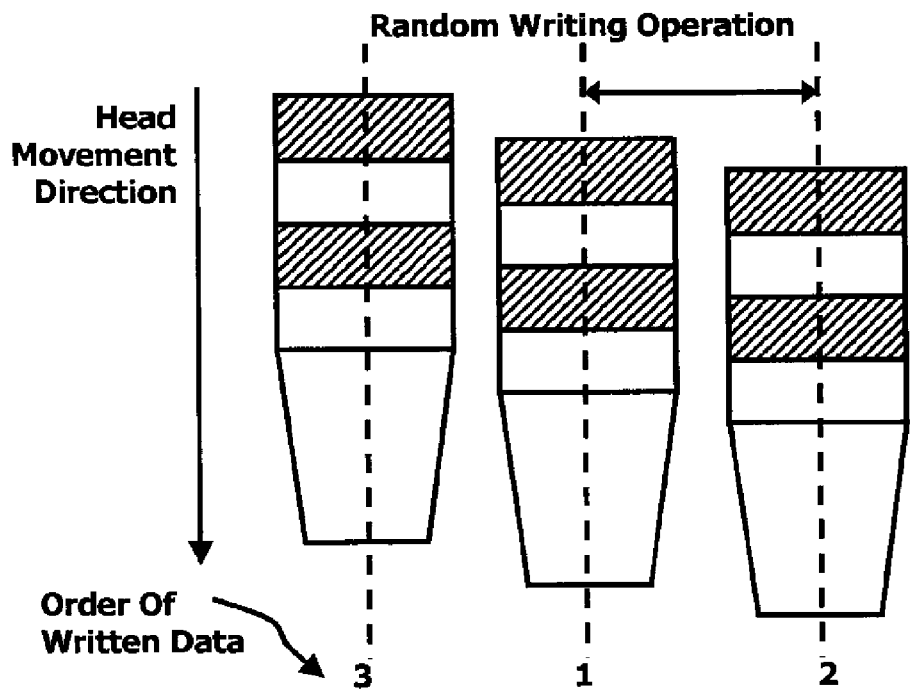
FIGS. 22A and 22B illustrate explanatory diagrams on which a memory capacity is increased in a one-direction write operation.
Figure 22B:
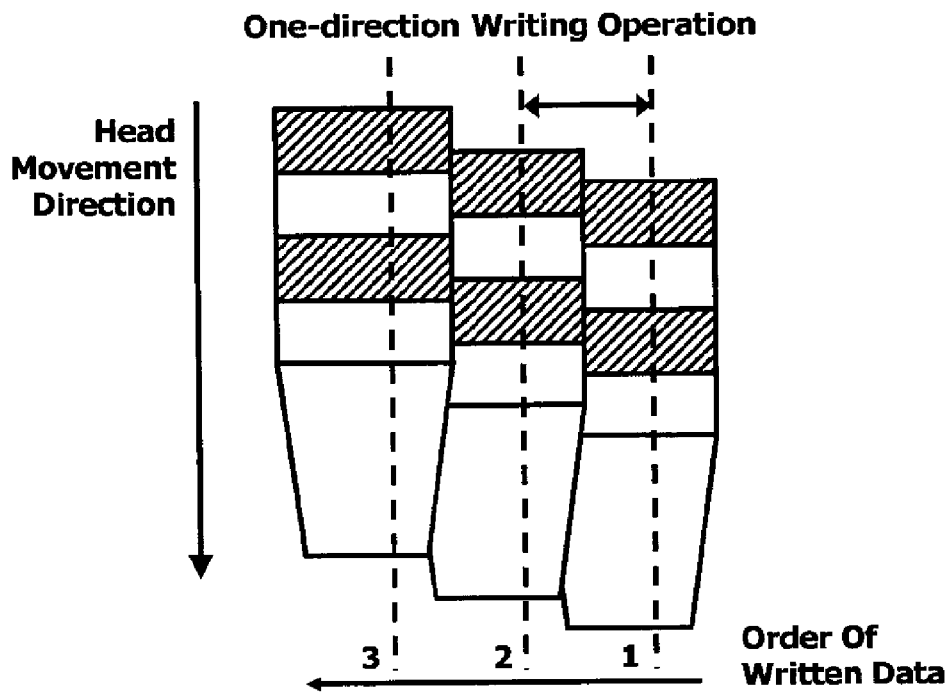
Figure 23:
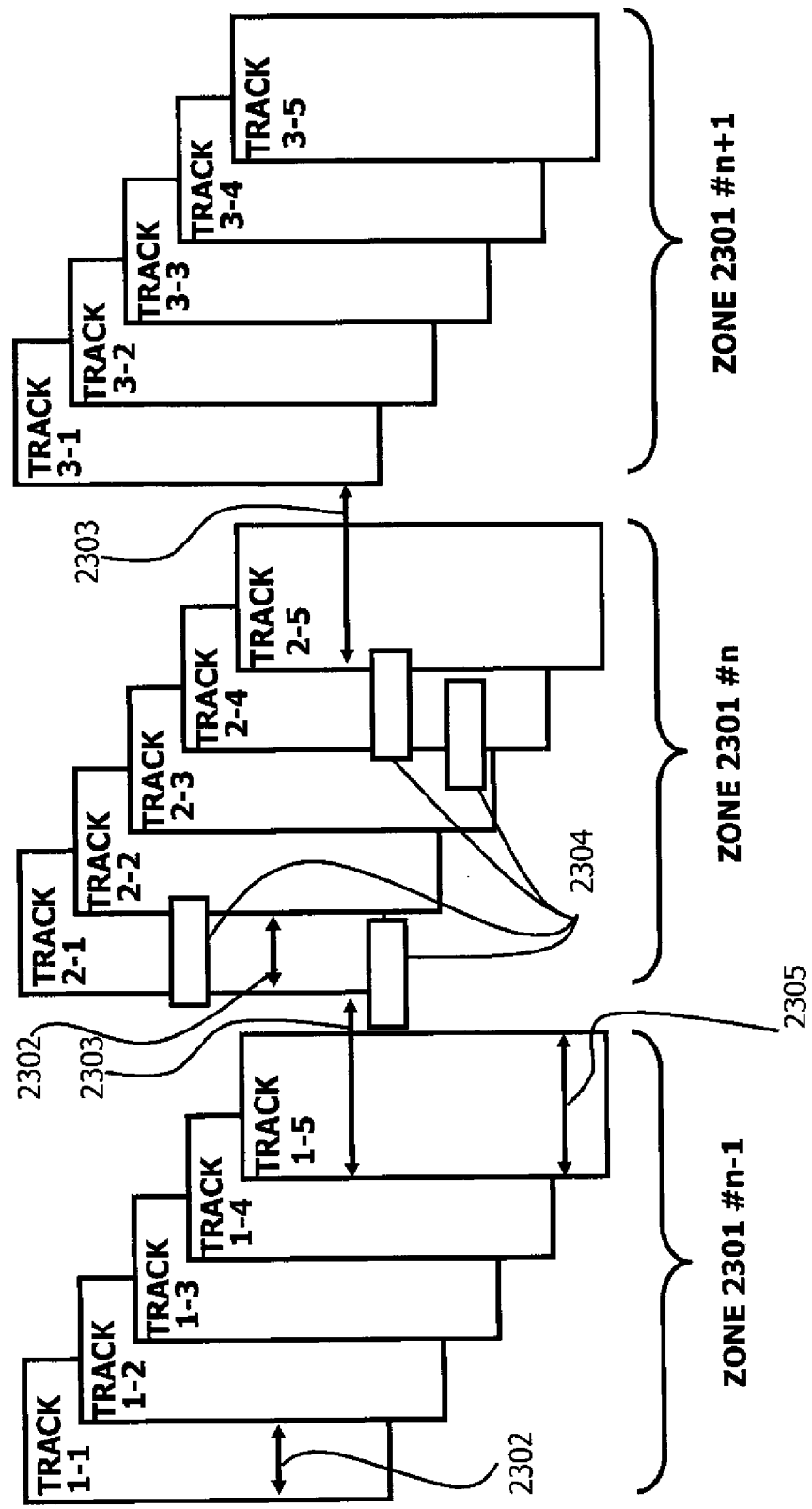
FIG. 23 illustrates a related art of the one-direction write operation.

FIG. 21 is an operation flowchart illustrating operation of the one-direction write controller 109 of FIG. 1 supporting the recording format of FIG. 20. In that operation flowchart, the control process of the fourth embodiment is also combined.

In the same manner as in FIG. 19, in response to a write request (or buffer-write request) from the hard disk controller 105, the one-direction write controller 109 determines whether the request is related to the content data (step S1901 of FIG. 21).

If the determination result in step S1901 is yes with the request being related to the content data, the one-direction write controller 109 performs the same operations as in steps S1201, S302, S1002, and S1202 in FIG. 12 in accordance with the fourth embodiment. In this way, an efficient one-direction writing including the search process of the end position of the recorded data according to the mark bit only is performed in the same manner as in the fourth embodiment. If the determination result in step S1901 is no with the request being related to the non-content data, the one-direction write controller 109 controls the write head controller 107 in the same manner as in FIG. 19. The write head controller 107 thus performs a standard random seek operation on the small surface recording density area 103 on the magnetic recording medium 101 (step S1902 of FIG. 19), and writes the non-content data from the buffer memory 106 onto the position sought in the random seek operation (step S1903 of FIG. 19).

In the discussion of the seventh embodiment, processing of a mixture of the content data and the non-content data is combined with the process of one of the first and fourth embodiments. The processing of the mixture may be combined with any of the second, the third, the fifth and the sixth embodiments.

It is an object of the embodiment to provide an efficient one-direction writing method appropriate for a write-once type HDD with a magnetic disk medium different in feature from a magnetic tape medium and an optical recording medium.

In accordance with a first aspect of the embodiment, a recording method of a magnetic disk device for recording information on a magnetic recording type medium having at least two recording regions different in recording density includes steps of recording a signal with tracks overlapping each other in a predetermined one direction when the information is recorded onto a first recording region of the medium, and recording a signal in a random seek operation when the information is recorded onto a second recording region smaller in surface recording density than the first recording region. The embodiment also relates a magnetic disk recording apparatus performing the above-described recording method.

In accordance with the first aspect of the embodiment, the recording method may further include a recorded data end position information recording step, wherein information indicating a position of an end of the recorded data written last in the one direction on the first recording region is recorded on the second recording region.

In accordance with the first aspect of the embodiment, the recording method may further include a recorded data end position information reading step for reading the information indicating the position of the end of the recorded data from the second recording region.

In accordance with the first aspect of the embodiment, the recording method may include a one-direction write start position searching step for seeking the head to a write start position to perform a one-direction write operation in the first recording region in accordance with the information indicating the position of the end of the recorded data end position.

In accordance with the first aspect of the embodiment, the recorded data end position information reading step is performed prior to writing of general data, and the recorded data end position information recording step is performed subsequent to the writing of the general data.

In accordance with the first aspect of the embodiment, the recorded data end position information recording step may be performed in succession to a confirmation that a request to perform a next one-direction write operation is not input within a predetermined period of time after a completion of a first one-direction write operation.

In accordance with the first aspect of the embodiment, the one-direction write operation may be performed in response to a buffer write command after the general data is stored on a buffer memory.

In accordance with the first aspect of the embodiment, the recorded data end position information reading step may be performed immediately subsequent to placing over a medium one of a write head for writing a signal and a read head for reading a signal on the medium and the recorded data end position information recording step is performed immediately prior to retracting the head from over the medium.

In accordance with a second aspect of the embodiment, a recording method of a magnetic disk device includes an indication mark recording step. The indication mark recording step includes recording, on a first recording region, indication mark identifying data recorded on the first recording region in a one-direction write operation. For example, the indication mark may be marker information recorded at the end of the data recorded on the first recording region in the one-direction write operation. The marker information may be a signal pattern having a predetermined length and predetermined frequency characteristics. Alternatively, the marker information may be mark bit information indicating a written state or an unused state and recorded by small recording unit (sector, for example) of the data recorded on the first recording region in the one-direction write operation.

In accordance with the second aspect of the embodiment, the recording method may include a pointer information recording step for recording, on a second recording region, pointer information pointing to the indication mark recorded on the first recording region in a last one-direction write operation.

In accordance with the second aspect of the embodiment, the recording method may include a pointer information reading step for reading the pointer information from the second recording region.

In accordance with the second aspect of the embodiment, the recording method may include an indication mark reading step for reading the indication mark from the first recording region.

In accordance with the second aspect of the embodiment, the recording method may include a one-direction write start position searching step for seeking the head to a write start position to perform a one-direction write operation in the first recording region in accordance with the read pointer information and indication mark.

In accordance with a third aspect of the embodiment, a recording method of a magnetic disk device includes an indication mark recording step. The indication mark recording step includes recording, on a first recording region, indication mark identifying data recorded on the first recording region in a one-direction write operation. The indication mark may be mark bit information indicating a written state or an unused state and recorded by small recording unit of the data recorded on the first recording region in the one-direction write operation.

In accordance with the third aspect of the embodiment, the recording method may include an indication mark reading step for reading the indication mark from the first recording region.

In accordance with the third aspect of the embodiment, the recording method may include a one-direction write start position searching step for seeking the head to a write start position to perform a one-direction write operation in the first recording region in accordance with the read indication mark.

In accordance with the third aspect of the embodiment, the indication mark reading step may be performed prior to writing of general data, and the indication mark recording step is performed subsequent to the writing of the general data.

In accordance with the third aspect of the embodiment, a recorded data end position information reading step may be performed immediately subsequent to placing over a medium one of a write head for writing a signal and a read head for reading a signal on the medium.

In accordance with a fourth aspect of the embodiment, a recording method of a magnetic disk device includes a one-direction write start position searching step for seeking the head to a write start position for a one-direction write operation on a first recording region in response to an output level of a read head.

In accordance with the fourth aspect of the embodiment, the one-direction write start position searching step may include seeking the head to the write start position on the first recording region in the one-direction write operation, based on a difference between an output level of the read head at a center position of a read track and an output level of the read head at an offset position of the read track offset from the center position by an offset amount responsive to a track overlap in the one-direction write operation.

In accordance with the fourth aspect of the embodiment, the one-direction write start position searching step may include seeking the head to the write start position on the first recording region in the one-direction write operation in accordance with an absolute value of the output level of the read head.

In accordance with each of the first through fourth aspects, the recording method may include a rewritable information recording step for recording, on the second recording region, rewritable information of a type that needs rewriting.

In accordance with each of the first through fourth aspects, the recording method may include a rewritable information reading step for reading the rewritable information from the second recording region in a random seek operation.

In accordance with embodiments, the recording method immediately determines the "write start position" in the write-once operation as necessary, and completely eliminates a sequential search for determining the write start position.

In accordance with embodiments, the recording method is free from a procedure that virtually obtains data management information after being overwritten several times through a complex data rewriting process. Without any complex process, necessary information is read fast and precisely even if that information have undergone several rewrites.

The embodiments allow management information to be written and read at a substantially higher efficiency than the related art. Performance of a recording apparatus is substantially increased. Since a recording region within a management data region, which could be otherwise consumed by a virtual overwriting of the management information, is saved, the recording efficiency of the recording apparatus is substantially increased.

The medium in the above embodiments has multiple radial tracks, but it may instead take a track configuration in the form of a single spiral track.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A recording method for a disk device having a medium having at least one track for storing data, and a head for writing data into the medium or reading data from the medium, the recording method comprising:
    writing sequential data into the medium along the at least one track in a predetermined radial direction;
    storing information indicating an end position along the at least one track where the end of the sequential data is written into;
    reading the information when additional sequential data is to be written into the medium;
    writing the additional data from a position along the at least one track next to the end position indicated by the information in the predetermined radial direction; and
    updating the information so as to indicate an end position along the at least one track where the end of the additional sequential data is written into,
    wherein the updating step updates the information immediately prior to retracting the head from over the medium.

2. A recording method for a disk device having a medium having a plurality of tracks for storing data and having at least two recording regions different in recording density by recording a signal with tracks overlapping each other in a predetermined one direction when information is recorded onto a first recording region of the medium and recording a signal in a random seek operation when information is recorded onto a second recording region smaller in surface recording density than the first recording region, and a head for writing data into the medium or reading data from the medium, the recording method comprising:
    writing sequential data into the medium along at least one track of the plurality of tracks in a predetermined radial direction;
    storing information indicating an end position along at least one track of the plurality of tracks where the end of the sequential data is written into;
    reading the information when additional sequential data is to be written into the medium;

writing the additional data from a position along at least one track of the plurality of tracks next to the end position indicated by the information in the predetermined radial direction;
updating the information so as to indicate an end position along at least one track of the plurality of tracks where the end of the additional sequential data is written into, and storing the information of the position of the end of the data to the first recording region;
recording, on the first recording region, indication mark identifying data recorded on the first recording region in a one-direction write operation;
recording, on the second recording region, pointer information pointing to the indication mark recorded on the first recording region in a last one-direction write operation;
reading the pointer information from the second recording region, an indication mark reading step for reading the indication mark from the first recording region; and
seeking the head to a write start position to perform a one-direction write operation in the first recording region in accordance with the read pointer information and indication mark.

3. The recording method according to claim 2, wherein the indication mark includes marker information to be recorded at the end of the data recorded on the first recording region in the one-direction write operation.

4. The recording method according to claim 3, wherein the marker information includes a signal pattern having a predetermined length and predetermined frequency characteristics.

5. The recording method according to claim 2, wherein the indication mark include mark bit information to be recorded at each minimum recording unit of the data recorded on the first recording region in the one-direction write operation, the mark bit information representing one of a written state and an unused state.

6. A recording method for a disk device having a medium having a plurality of tracks for storing data and having at least two recording regions different in recording density by recording a signal with tracks overlapping each other in a predetermined one direction when information is recorded onto a first recording region of the medium and recording a signal in a random seek operation when information is recorded onto a second recording region smaller in surface recording density than the first recording region, and a head for writing data into the medium or reading data from the medium, the recording method comprising:
writing sequential data into the medium along at least one track of the plurality of tracks in a predetermined radial direction;
storing information indicating an end position along at least one track of the plurality of tracks where the end of the sequential data is written into;
reading the information when additional sequential data is to be written into the medium;
writing the additional data from a position along at least one track of the plurality of tracks next to the end position indicated by the information in the predetermined radial direction;
updating the information so as to indicate an end position along the at least one track where the end of the additional sequential data is written into, and storing the information of the position of the end of the data to the first recording region;
recording, on the first recording region, an indication mark identifying data recorded on the first recording region in a one-direction write operation;
reading the indication mark from the first recording region; and
seeking the head to a write start position to perform the one-direction write operation in the first recording region in accordance with the read indication mark,
wherein the indication mark may include mark bit information to be recorded at each minimum recording unit of the data recorded on the first recording region in the one-direction write operation, the mark bit information representing one of a written state and an unused state.

7. A method for recording a magnetic disk device recording information on a magnetic recording type medium having at least two recording regions different in recording density, the method comprising:
recording a signal with tracks overlapping each other in a predetermined one direction when the information is recorded onto a first recording region of the medium;
recording a signal in a random seek operation when the information is recorded onto a second recording region smaller in surface recording density than the first recording region; and
seeking the head to a write start position to perform a one-direction write operation in the first recording region in accordance with an output level of a read head,
wherein the seeking step further includes seeking the head to the write start position to perform the one-direction write operation in the first recording region in accordance with a difference between an output level of the read head at a center position of a read track and an output level of the read head at an offset position offset from the center position by an offset amount responsive to a track overlap in the one-direction write operation.

8. A method for recording a magnetic disk device recording information on a magnetic recording type medium having at least two recording regions different in recording density, the method comprising:
recording a signal with tracks overlapping each other in a predetermined one direction when the information is recorded onto a first recording region of the medium;
recording a signal in a random seek operation when the information is recorded onto a second recording region smaller in surface recording density than the first recording region; and
seeking the head to a write start position to perform a one-direction write operation in the first recording region in accordance with an output level of a read head,
wherein the seeking step further includes seeking the head to the write start position on the first recording region in the one-direction write operation in accordance with an absolute value of the output level of the read head.

9. An apparatus for storing data, comprising:
a medium having a plurality of tracks for storing data and having at least two recording regions different in recording density by recording a signal with tracks overlapping each other in a predetermined one direction when information is recorded onto a first recording region of the medium, recording a signal in a random seek operation when the information is recorded onto a second recording region smaller in surface recording density than the first recording region;
a head for writing data into the medium or reading data from the medium; and
a controller for executing a process including,
writing sequential data into the medium along at least one track of the plurality of tracks in a predetermined radial direction, storing information indicating an end position along at least one track of the plurality of tracks where the end of the sequential data is written into, reading the information when additional sequential data is to be written into the medium, writing the additional sequential data from a position along at least one track of the plurality of tracks next to the end position indicated by the information in the predetermined radial direction, updating the information so as to indicate an end position along at least one track of the plurality of tracks where the end of the additional sequential data is written into, and storing the information of the position of the end of the data to the first recording region, recording on the first recording region, indication mark identifying data recorded on the first recording region in a one-direction write operation, recording, on the second recording region, pointer information pointing to the indication mark recorded on the first recording region in a last one-direction write operation, reading the pointer information from the second recording region, reading the indication mark from the first recording region, and seeking the head to a write start position to perform a one-direction write operation in the first recording region in accordance with the read pointer information and indication mark.

* * * * *